United States Patent
Reed

(10) Patent No.: US 6,634,779 B2
(45) Date of Patent: Oct. 21, 2003

(54) METHOD AND APPARATUS FOR LINEAR LED LIGHTING

(75) Inventor: David Reed, Sebastopol, CA (US)

(73) Assignee: RPM Optoelectronics, Inc., Santa Rosa, CA (US)

( * ) Notice: Subject to any disclaimer, the term of this patent is extended or adjusted under 35 U.S.C. 154(b) by 0 days.

(21) Appl. No.: 09/798,609

(22) Filed: Feb. 27, 2001

(65) Prior Publication Data

US 2002/0126503 A1 Sep. 12, 2002

Related U.S. Application Data

(60) Provisional application No. 60/260,425, filed on Jan. 9, 2001.

(51) Int. Cl.[7] .............................................. H01L 33/00
(52) U.S. Cl. ........................ 362/555; 362/800; 362/223
(58) Field of Search .................... 362/555, 231, 362/230, 800, 217, 801, 551, 125, 133, 223, 223.6; 52/23, 36.1

(56) References Cited

U.S. PATENT DOCUMENTS

| | | | |
|---|---|---|---|
| 4,228,484 A | 10/1980 | Johnstone | 362/184 |
| D280,766 S | 9/1985 | Fujita et al. | D26/2 |
| 4,727,289 A | 2/1988 | Uchida | 315/71 |
| 4,847,734 A * | 7/1989 | Katoh | 362/555 |
| 4,967,330 A | 10/1990 | Bell et al. | 362/311 |
| 5,066,889 A | 11/1991 | Edwards | 313/512 |
| 5,174,649 A | 12/1992 | Alston | 362/244 |
| 5,218,233 A | 6/1993 | Takahashi | 257/787 |
| 5,289,082 A | 2/1994 | Komoto | |
| 5,303,124 A | 4/1994 | Wrobel | 362/20 |
| 5,325,271 A | 6/1994 | Hutchisson | 362/32 |
| D356,391 S | 3/1995 | Sugiura et al. | D26/138 |
| D360,046 S | 7/1995 | Sugiura | D26/60 |
| 5,442,258 A | 8/1995 | Shibata | 315/129 |
| D363,565 S | 10/1995 | Sugiura | D26/60 |
| 5,490,049 A | 2/1996 | Montalan et al. | 362/240 |
| 5,523,591 A | 6/1996 | Fleming et al. | 257/91 |
| 5,528,474 A | 6/1996 | Roney et al. | 362/249 |
| 5,548,676 A | 8/1996 | Savage, Jr. | 385/92 |
| 5,561,346 A | 10/1996 | Byrne | 313/512 |
| 5,564,819 A | 10/1996 | Yamaguchi | 362/241 |
| 5,592,578 A | 1/1997 | Ruh | 385/31 |
| 5,632,551 A | 5/1997 | Roney et al. | 362/249 |
| 5,639,158 A | 6/1997 | Sato | 362/247 |
| 5,656,847 A | 8/1997 | Okazaki et al. | 257/433 |
| 5,661,374 A | 8/1997 | Cassidy et al. | 315/307 |
| D385,051 S | 10/1997 | Wu | D26/2 |
| 5,688,042 A | 11/1997 | Madadi et al. | 362/240 |
| D388,726 S | 1/1998 | Wu | D10/115 |
| 5,726,535 A | 3/1998 | Yan | 315/185 |
| 5,727,862 A | 3/1998 | Wu | 326/27 |
| 5,732,176 A | 3/1998 | Savage, Jr. | 385/92 |
| 5,752,766 A | 5/1998 | Bailey et al. | 362/250 |
| 5,765,940 A | 6/1998 | Levy et al. | 362/240 |
| 5,806,965 A | 9/1998 | Deese | 362/249 |
| 5,833,355 A | 11/1998 | You et al. | 362/244 |
| 5,850,126 A | 12/1998 | Kanbar | 315/200 |
| 5,887,968 A | 3/1999 | Logan | 362/241 |

(List continued on next page.)

FOREIGN PATENT DOCUMENTS

| | | | |
|---|---|---|---|
| JP | 6-94922 | * | 4/1994 |
| JP | 6-148435 | * | 5/1994 |
| JP | 10-126581 | * | 5/1998 |

*Primary Examiner*—Sandra O'Shea
*Assistant Examiner*—Hargobind S. Sawhney
(74) *Attorney, Agent, or Firm*—Blakely Sokoloff Taylor & Zafman

(57) ABSTRACT

A linear light emitting diode (LED) light including electrical-to-optical converters (EOs) on circuit boards in end housings to couple photons into ends of an acrylic rod. Photons from the electrical-to-optical converters radiate from the acrylic rod to light the space around the linear LED light.

18 Claims, 24 Drawing Sheets

U.S. PATENT DOCUMENTS

| | | | |
|---|---|---|---|
| 5,898,381 A | 4/1999 | Gartner et al. | 340/815 |
| 5,947,588 A | 9/1999 | Huang | 362/235 |
| 5,954,423 A | 9/1999 | Logan et al. | 362/235 |
| 5,962,971 A | 10/1999 | Chen | 313/512 |
| 5,973,336 A | 10/1999 | Hanke et al. | 257/94 |
| D418,928 S | 1/2000 | Zhang et al. | D26/2 |
| 6,019,493 A | 2/2000 | Kuo et al. | 326/800 |
| 6,033,087 A | 3/2000 | Shozo et al. | 362/244 |
| 6,045,240 A | 4/2000 | Hochstein | 362/294 |
| 6,054,932 A | 4/2000 | Gartner et al. | 340/815 |
| 6,091,614 A | 7/2000 | Malenfant | 363/97 |
| 6,109,764 A | 8/2000 | Shu | 362/226 |
| 6,115,184 A | 9/2000 | Hubble, III et al. | 359/627 |
| 6,127,784 A | 10/2000 | Grossman et al. | 315/159 |
| 6,139,174 A * | 10/2000 | Butterworth | 362/555 |
| 6,149,283 A | 11/2000 | Conway et al. | 362/236 |
| 6,153,985 A | 11/2000 | Grossman | 315/291 |
| 6,161,910 A | 12/2000 | Reisnauer et al. | 316/309 |
| 6,168,294 B1 | 1/2001 | Erni et al. | 362/298 |
| 6,177,761 B1 | 1/2001 | Pelka et al. | 313/512 |
| 6,184,628 B1 | 2/2001 | Ruthenberg | 315/185 |
| 6,193,392 B1 | 2/2001 | Lodhie | 362/235 |
| D440,513 S | 4/2001 | Smith | D10/114 |
| D441,678 S | 5/2001 | Lyons | D10/114 |
| 6,224,216 B1 | 5/2001 | Parker et al. | 353/31 |
| 6,227,679 B1 | 5/2001 | Zhang et al. | 362/236 |
| 6,234,645 B1 | 5/2001 | Borner et al. | 362/231 |
| 6,236,331 B1 | 5/2001 | Dussureault | 340/815 |
| 6,254,262 B1 | 7/2001 | Crunk et al. | 362/544 |
| 6,357,903 B1 * | 3/2002 | Furusawa | 362/555 |

* cited by examiner

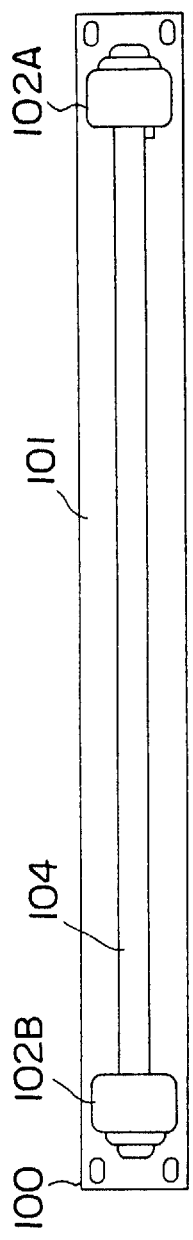
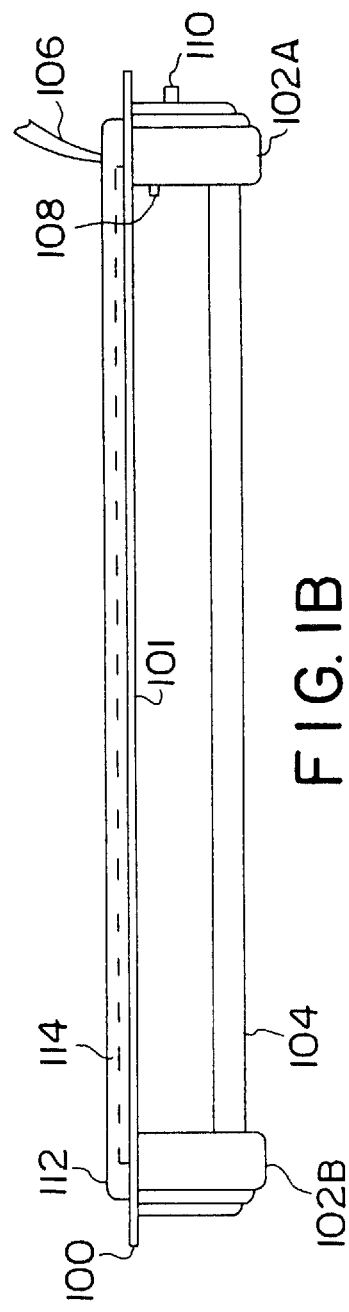
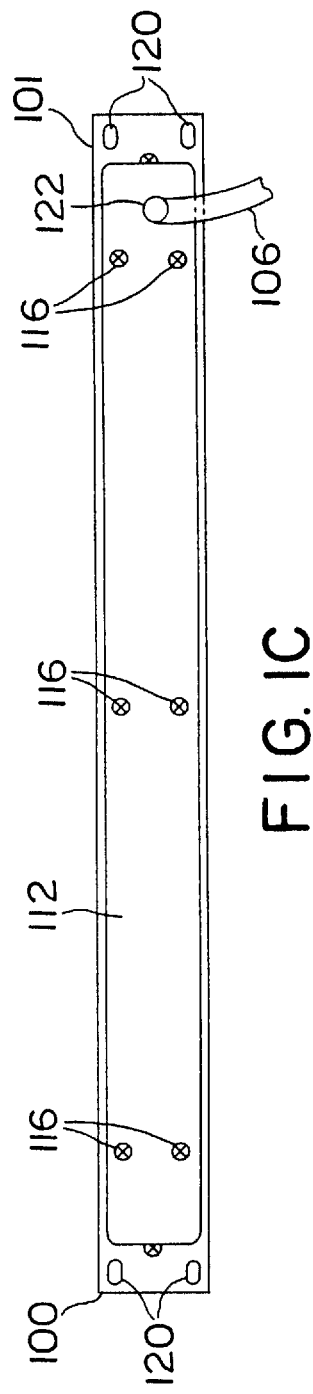

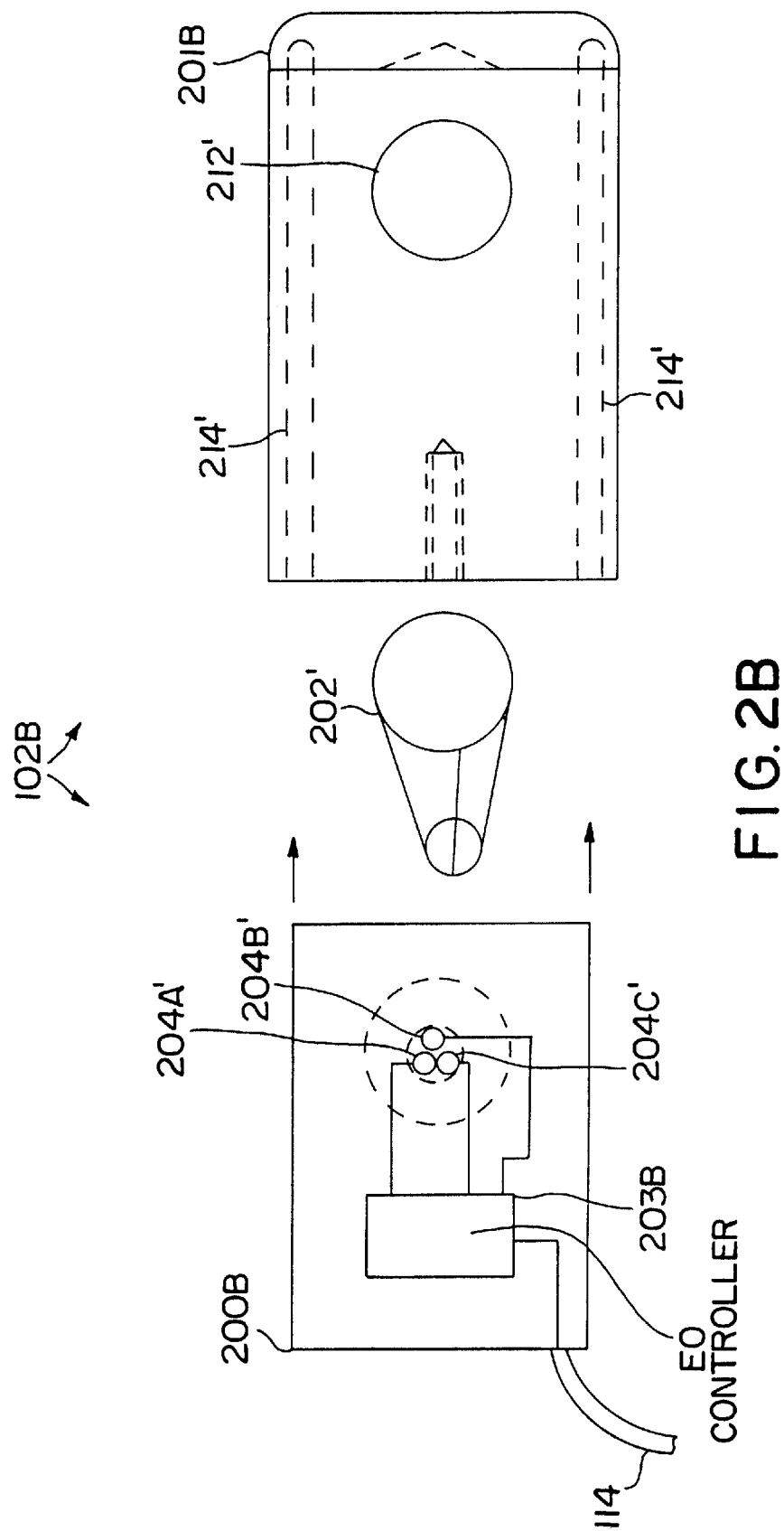

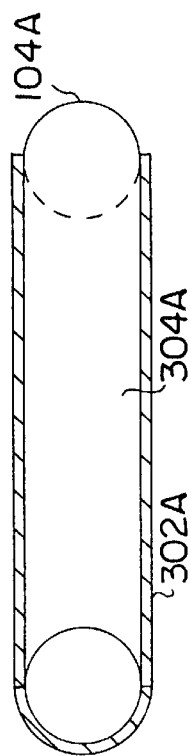
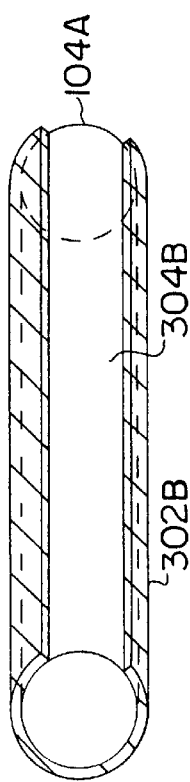
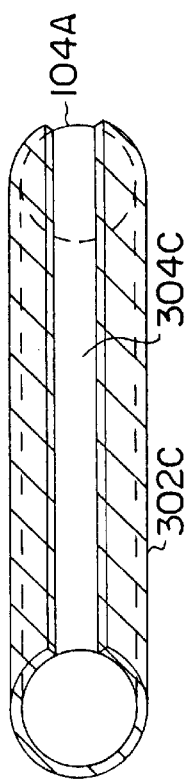
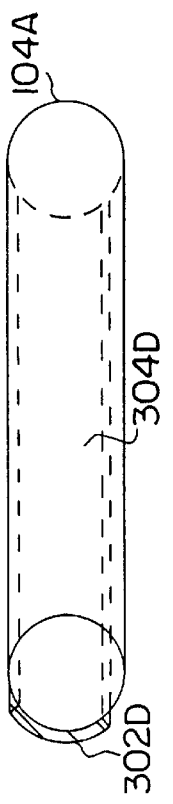
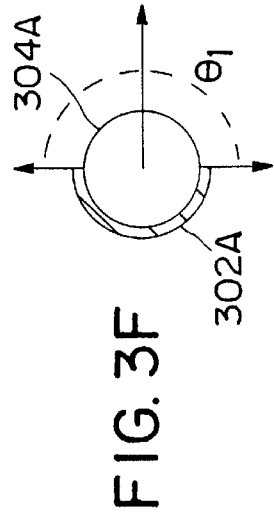
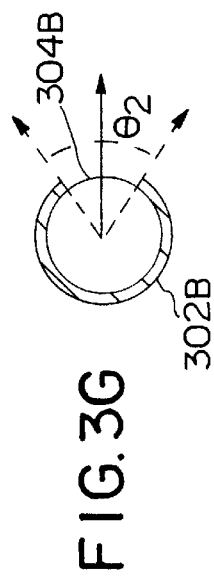
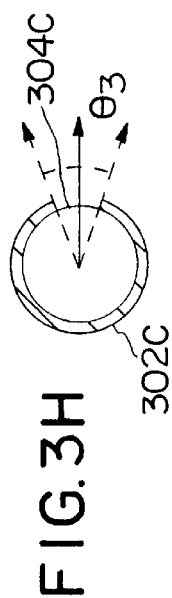
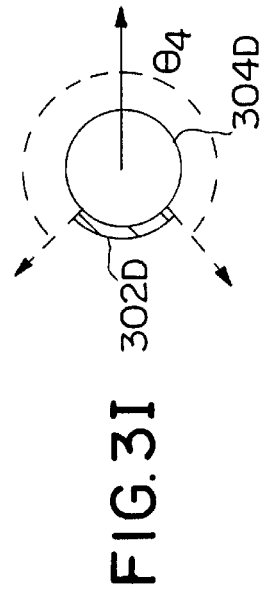
FIG. 3F    FIG. 3G    FIG. 3H    FIG. 3I

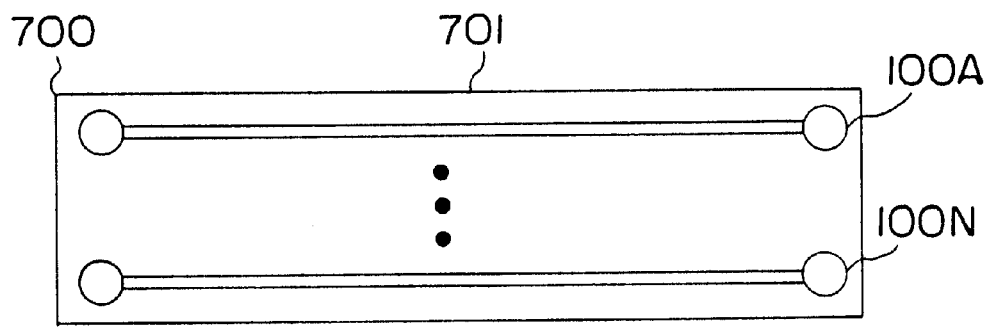
F I G. 7A
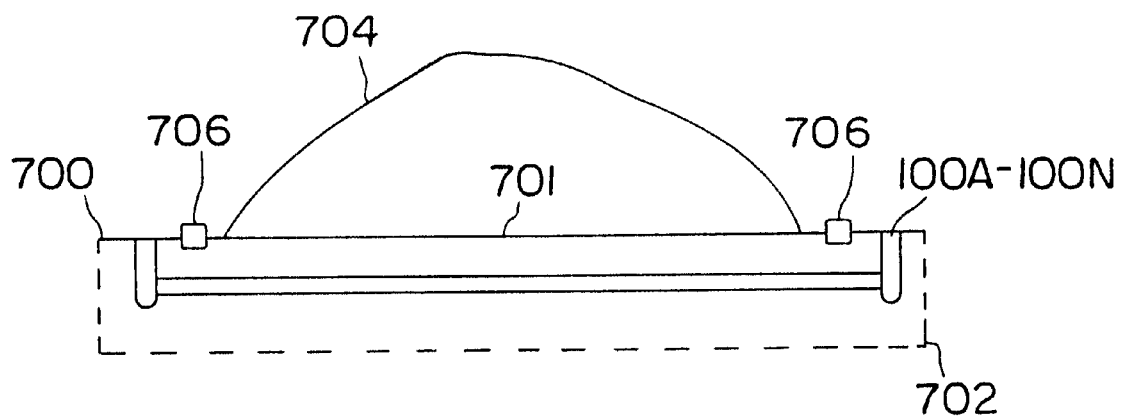
F I G. 7B

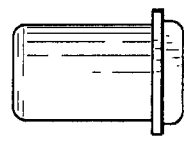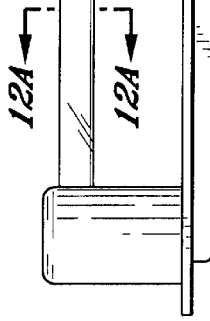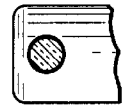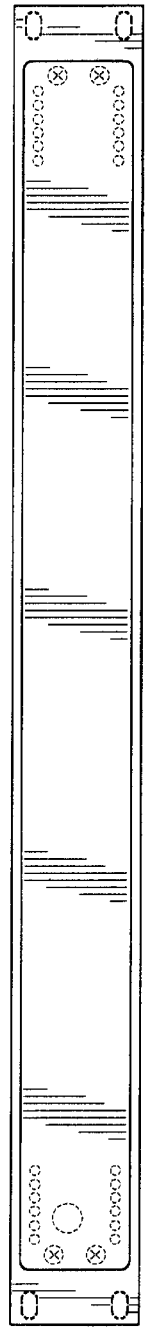

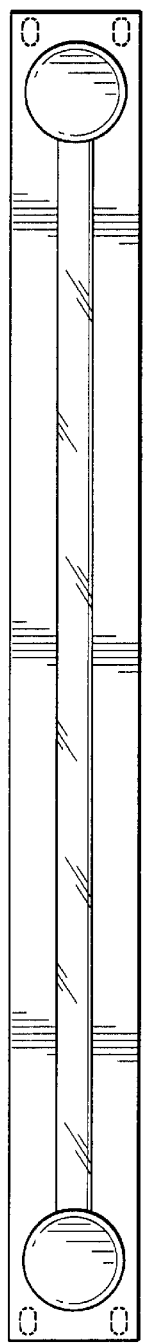
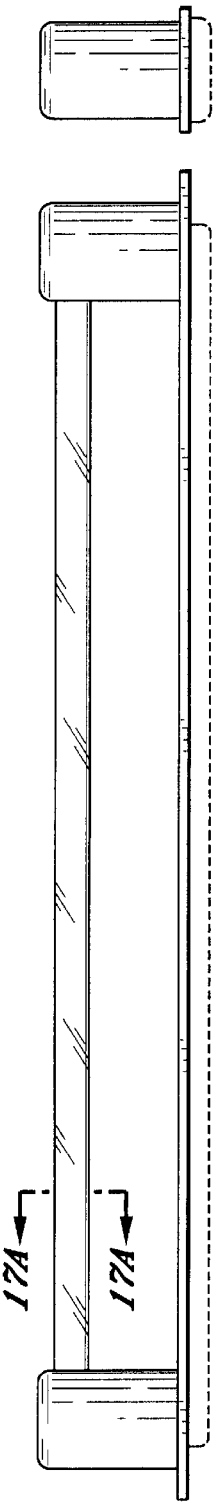
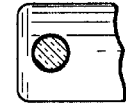
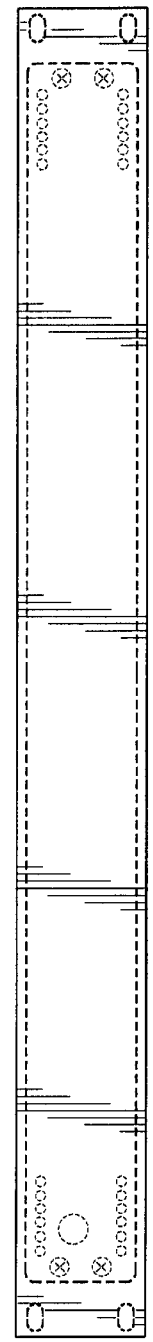
Fig. 16  Fig. 17  Fig. 18  Fig. 17A  Fig. 19

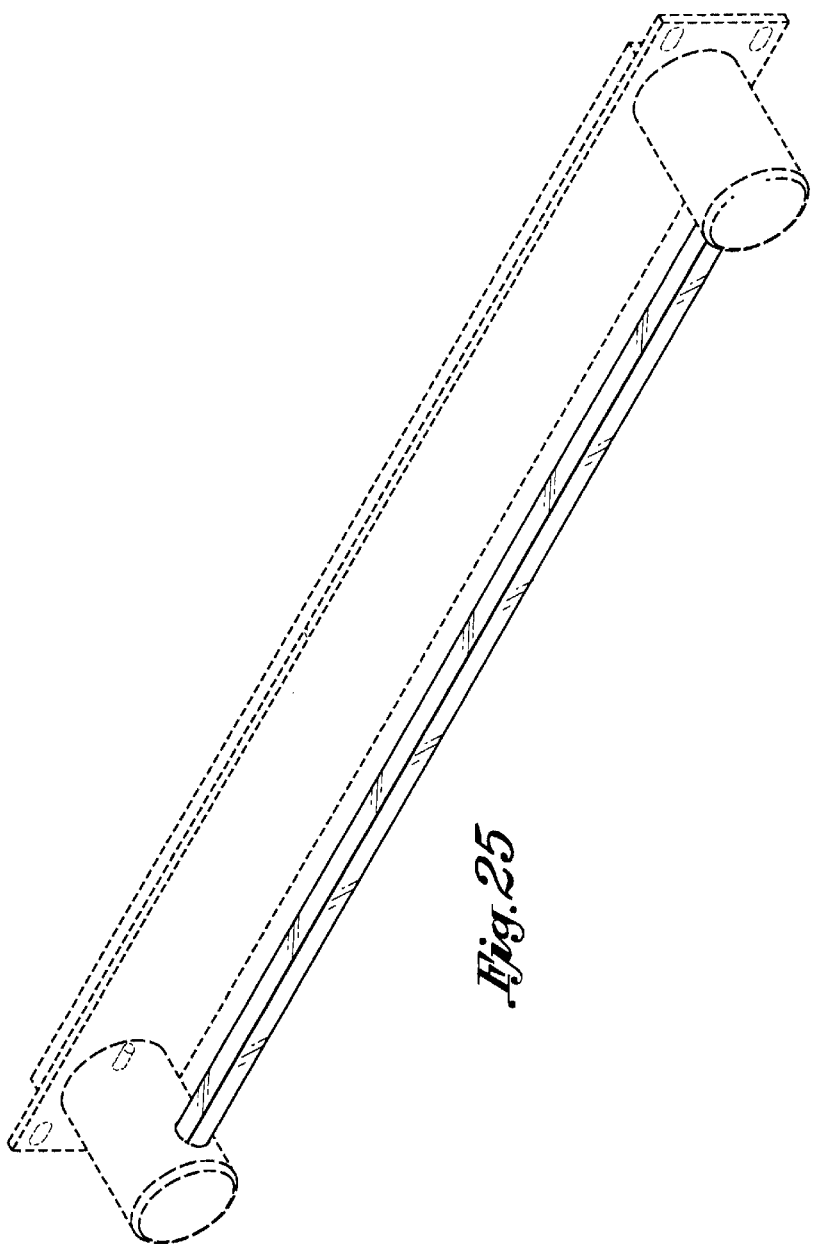
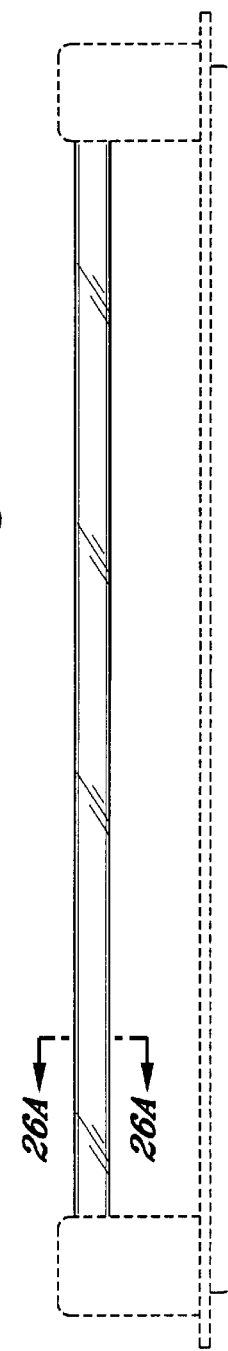
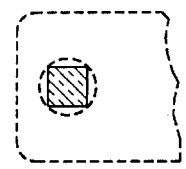
Fig.25
Fig.26
Fig.26A

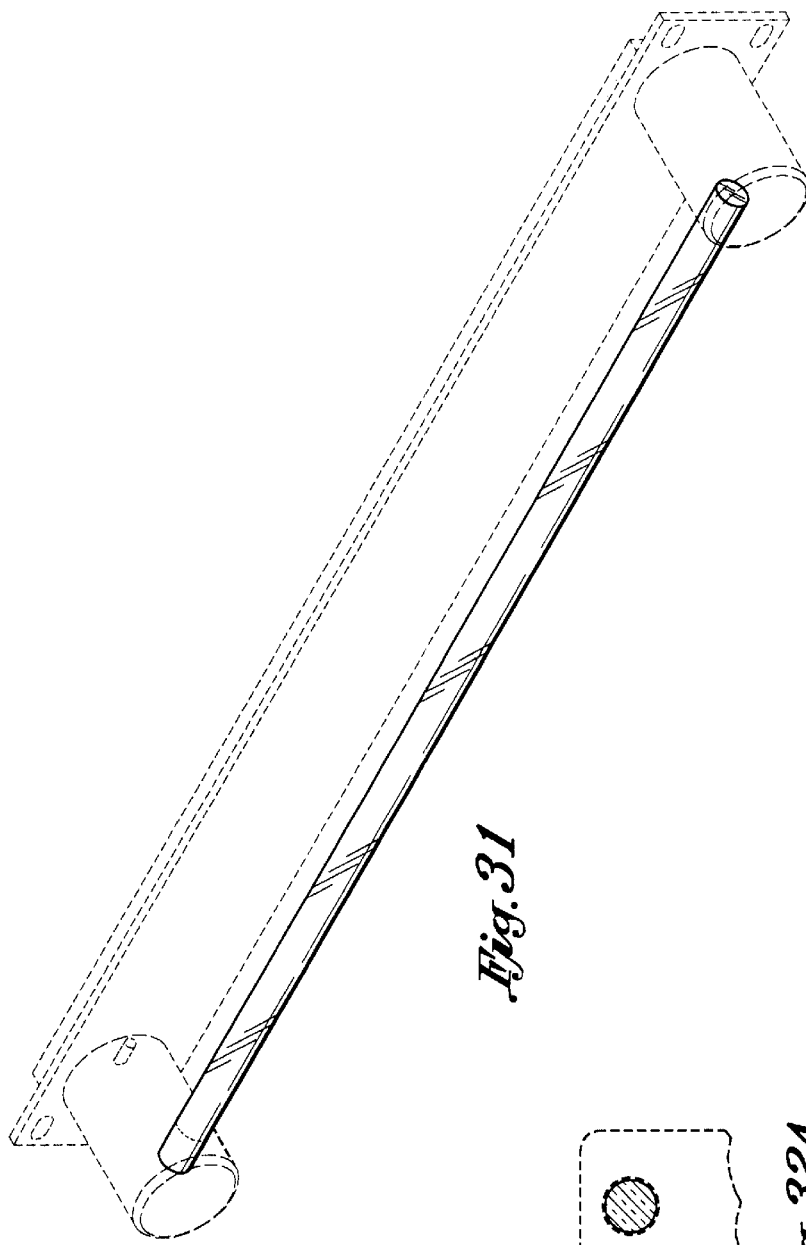
Fig. 31
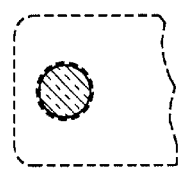
Fig. 32A
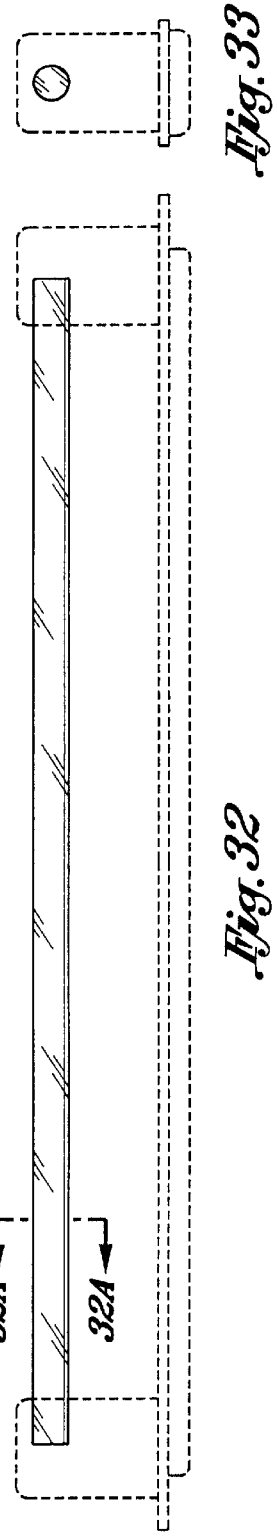
Fig. 32
Fig. 33

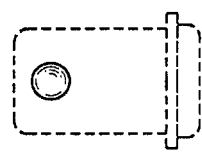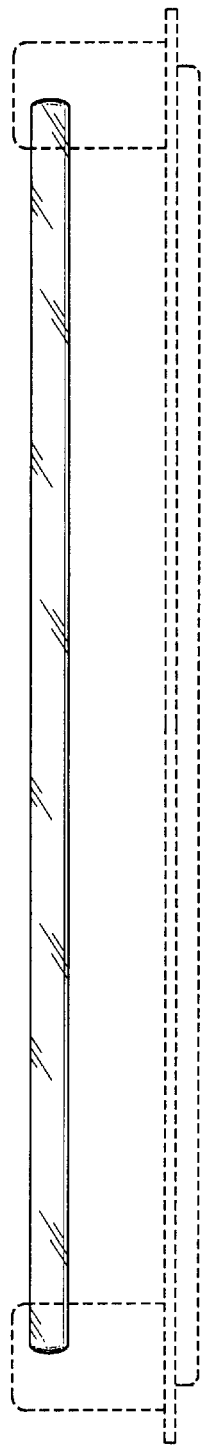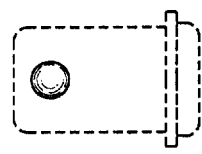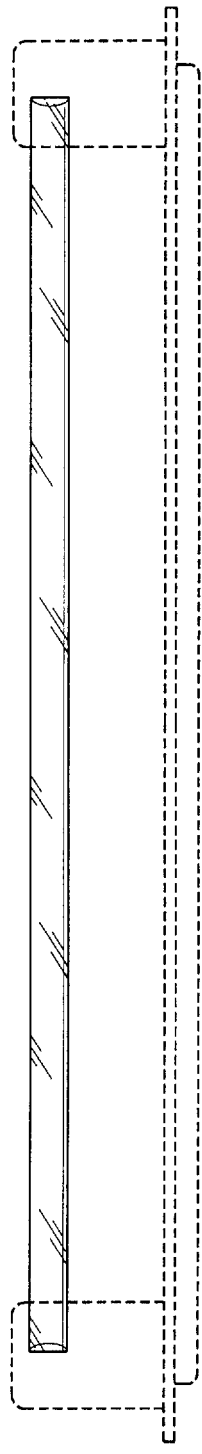

METHOD AND APPARATUS FOR LINEAR LED LIGHTING

CROSS REFERENCE TO RELATED APPLICATION

This non-provisional United States (US) patent application claims the benefit of US Provisional Application No. 60/260,425, filed by inventor David Reed on Jan. 9, 2001.

FIELD OF THE INVENTION

The present invention relates generally to the field of lighting. Particularly, the present invention relates to optical lighting by means of light emitting diodes.

BACKGROUND OF THE INVENTION

Equipment lighting in a rack has typically been performed by fluorescent, incandescent or halogen lighting fixtures. This type of lighting uses fluorescent, incandescent or halogen bulbs respectively. These bulbs tend to be fragile and can break if not carefully handled. Furthermore, these bulbs have a limited lifetime and can burn out when filaments therein are depleted and break. Once burned out, a new bulb needs to replace the burned out bulb before the lighting functions again.

Additionally, incandescent and halogen lighting are inefficient lighting technologies. The inefficiency results in the generation of heat. The heat generated tends to make bulbs hot to touch and may require shielding. Fluorescent fixtures are oftentimes noisy due to the balances and they sometimes emit radio frequency interference which can interfere with desirable radio frequency signals.

Furthermore, fluorescent, incandescent and halogen lighting generate an uneven source of light that needs to be reflected or modified to illuminate a desired area.

It is desirable to overcome the limitations of the prior art.

BRIEF DESCRIPTION OF THE DRAWINGS

FIG. 1A is a front side view of the present invention.

FIG. 1B is a top side view of the present invention.

FIG. 1C is a back side view of the present invention.

FIGS. 2A–2B are exploded views of circuit board and rod housings of the present invention.

FIGS. 7A–7B are a bottom side view and a side view respectively of a light fixture in which the present invention may be utilized to provide lighting.

FIG. 11 is a top plan view thereof;

FIG. 12 is a front side elevational view thereof, the back side being a mirror image;

FIG. 12A is a cutaway cross section view thereof;

FIG. 13 is a right side elevational view thereof, the left side being a mirror image;

FIG. 14 is a bottom plan view thereof;

FIG. 16 is a top plan view thereof;

FIG. 17 is a front side elevational view thereof, the back side being a mirror image;

FIG. 17A is a cutaway cross section view thereof;

FIG. 18 is a right side elevational view thereof, the left side being a mirror image;

FIG. 19 is a bottom plan view thereof;

FIG. 25 is a perspective view of a first embodiment of our new design of a transparent rod for a light;

FIG. 26 is a front side elevational view thereof, the back side being a mirror image;

FIG. 26A is a cutaway cross section view thereof;

FIG. 31 is a perspective view of a fourth embodiment of our new design of a transparent rod for a light;

FIG. 32 is a front side elevational view thereof, the back side being a mirror image;

FIG. 32A is a cutaway cross section view thereof;

FIG. 33 is a right side elevational view thereof, the left side being a mirror image;

FIG. 34 is a front side elevational view of a fifth embodiment of our new design of a transparent rod for a light, the back side being a mirror image;

FIG. 35 is a right side elevational view thereof, the left side being a mirror image;

FIG. 36 is a front side elevational view of a sixth embodiment of our new design of a transparent rod for a light, the back side being a mirror image;

FIG. 37 is a right side elevational view thereof, the left side being a mirror image;

Like reference numbers and designations in the drawings indicate like elements providing similar functionality.

Figure 2A:
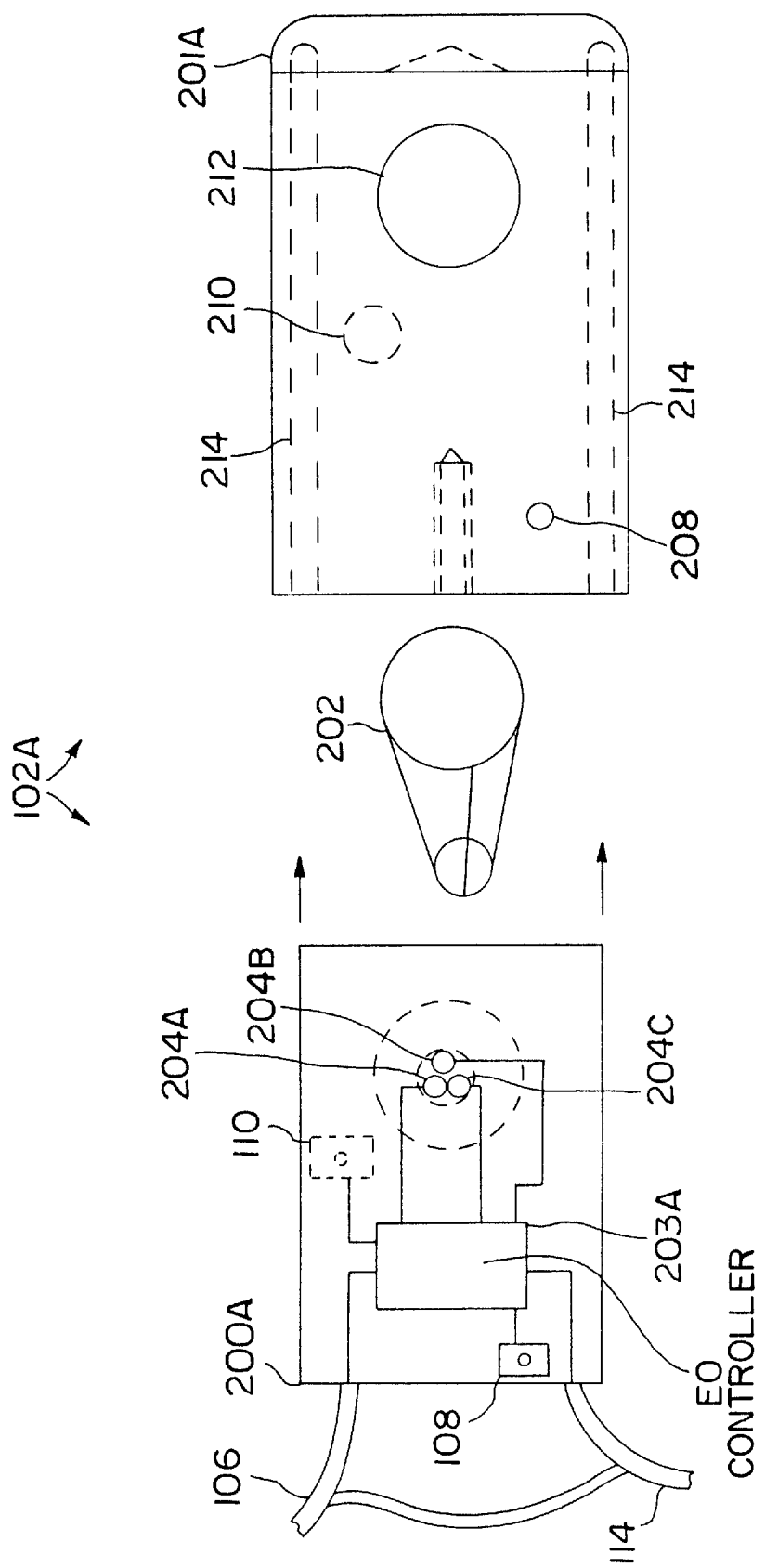

The light is used to provide lighting.

The transparent rod allows light to disperse therefrom for a light to provide lighting.

The broken lines shown in FIGS. 10–41 are for illustrative purposes only and form no part of the embodiments of our new designs.

DETAILED DESCRIPTION OF THE INVENTION

In the following detailed description of the present invention, numerous specific details are set forth in order to provide a thorough understanding of the present invention. However, it will be obvious to one skilled in the art that the present invention may be practiced without these specific details. In other instances well known methods, procedures, components, and circuits have not been described in detail so as not to unnecessarily obscure aspects of the present invention.

Referring now to FIGS. 1A through 1C, a linear light emitting diode (LED) light 100 is illustrated. The linear LED light 100 utilizes an acrylic rod 104 to radiate light to provide lighting. The linear LED light 100 uses no light bulb that can burn out and thus no fragile bulb will ever need replacing. The lighting provided by the linear LED light 100 is a cool light because it is efficient and uses no light-bulbs. The color of the light can be factory programmed or user selectable and includes the color settings or red, amber, green, blue, and white. The linear LED light 100 utilizes sold-state technology in order to provide energy efficiency.

The linear LED light 100 includes a mounting plate 101, a first circuit board and rod housing 102A, a second circuit board and rod housing 102B, and the acrylic rod 104. Each of the circuit board and rod housings 102A–102B includes a printed circuit board with one or more electrical-to-optical converters (EOs) to generate light or photons and an opening to hold the acrylic rod 104 in place. The electrical-to-optical converters are transducers which convert electrons of an electrical signal into light or photons of an optical signal. The linear LED light 100 functions by having the electrical-to-optical converters generate photons and couple them into one or both ends of the acrylic rod 104. The photons coupled into the acrylic rod 104 travel down a portion of its length, disperse and radiate outward. A reflector coupled to the acrylic rod 104 can reflect photons radiating outward in one direction to radiate out a different direction.

Referring now to FIG. 1B, the circuit board and rod housing 102A includes an on/off switch 108 and an optional selection switch 110. To provide power to the linear LED light 100, a power cable 106 is provide which couples through an opening in a backside housing 112. The backside housing 112 allows an interconnect cable 114, including signal and power wires, to propagate from the first circuit board and rod housing 102A to the second circuit board and rod housing 102B.

Referring now to FIG. 1C, a plurality of screws 116 hold the backside housing 112 coupled to the mounting plate 101. The mounting plate 101 includes one of more mounting through-holes 120 into which screws or bolts may be inserted in order to mount the linear LED light 100 to a surface or structure. The power cable 106 protrudes through an opening 122 in the backside housing 112.

The on/off switch 108 powers the linear LED light 100 on and off. The on/off switch 108 can be a push button switch, a turn-able knob or a sliding switch. The optional selection switch 110 in one embodiment functions so that a user can select the color, hint or hue of the light that is desired. In another embodiment, the optional selection switch 110 functions so that a user can select the intensity or brightness of light that is desired. In another yet embodiment, the optional selection switch 110 is not provided and the linear LED lighting has the light color and light intensity factory programmed.

In one embodiment, the color of lighting provided by the linear LED light can be selected by varying the mixture of light generated by red, green, and blue light emitting diodes (LEDs) into a clear acrylic rod. The current to each of the red, green, and blue LEDs can be individually varied to select a mixture of primary colors to generate the color of light injected into the rod 104. In another case, the rod 104 itself can be colored or pigmented. Phosphors can also be included into the acrylic rod and excited by a blue light from blue LEDs to radiate a white light for example. Thus, various colors of light generated by the linear LED light can also be formed by combining a mixture of LED colors and a rod color.

In an alternate embodiment, the intensity or brightness of the light can also be smoothly varied by varying the current to the light emitting diodes over a range. The current can be varied by proportional amounts to maintain the same color. In yet another alternate embodiment, the intensity or brightness of the light can also be varied at set levels by completely turning on or off one or more light emitting diodes of a same color.

Referring now to FIG. 2A, an exploded view of the circuit board and rod housing 102A is illustrated. The circuit board and rod housing 102A includes a printed circuit board 200A, an outer shell 201A, and a reflector 202. The printed circuit board 200A includes the on/off switch 108, the optional selection switch 110, an electrical-to-optical controller 203A and one or more electrical-to-optical converters 204A–204C. In one embodiment, the electrical-to-optical converters 204A–204C are light emitting diodes to emit an incoherent light. An incoherent light when coupled into the rod 104 disperses and radiates outward. In another embodiment where a dispersing reflector is provided at each end of the rod, the electrical-to-optical converters (EOs) 204A–204C can be semi-conductor laser diodes which emit a coherent light into the rod. In any case, the electrical-to-optical converters 204A–204C emit photons of a desired color (i.e. frequency) which are coupled into the acrylic rod 104. The power cable 106 couples to the printed circuit board 200A and the EO controller 203A. Control signals from the EO controller 203A couple into the interconnect cable 114 as well as power lines from the power cable 106. The EO controller 203A couples to the on/off switch 108, the optical selection switch 110, and the one or more electrical-to-optical converters 204A–204C.

The outer shell 201A of the circuit board and rod housing 102A includes an on/off switch opening 208, an optional selector switch opening 210, a rod opening 212, and circuit board support rails 214. The on/off switch opening 208 allows a knob, a slider or a push button of the on/off switch 108 to protrude through the outer shell 201A. The optional selector switch opening 210 similarly allows a rotary or push button selector switch or knob of the optional selection switch 110 to protrude through. The rod opening 212 allows the acrylic rod 104 to protrude through the outer shell 102A so that its end can receive photons from the one or more electrical-to-optical converters 204A–204C.

The reflector 202 mounts to the printed circuit board 200A and also slides into the outer shell 201A. The reflector 202 has a first opening at one end through which the light of the one or more electrical-to-optical converters 204A–204C can shine and a second opening at an opposite end to mate with the rod opening 212 in the outer shell 201A. An end of the rod 104 is inserted into the rod opening 212 and the second opening of the reflector 202 down near the first opening of the reflector and the one or more electrical-to-optical converters 204A–204C. The reflector 202 acts similar to a reflector in a flashlight and includes an inner reflective surface to reflect dispersing light towards the rod opening 212. The inner reflective surface of the reflector 202 may be a silver dip coated surface or alternatively can be another type of surface to reflect or diffract light into the rod 104. The shape of the reflector 202 in one embodiment is concave. In another embodiment the reflector 202 may have a conical shape or some other shape to focus light towards the rod 104. In any case, the reflector more efficiently launch the light from the one or more electrical-to-optical converters 204A–204C into an end of the rod 104.

Referring now to FIG. 2B, an exploded view of the circuit board and rod housing 102B is illustrated. The circuit board and rod housing 102B includes a printed circuit board 200B, an outer shell 201B, and a reflector 202'. The printed circuit board 200B includes an electrical-to-optical (EO) controller 203B, and one or more electrical-to-optical converters 204A'–204C'. The printed circuit board 200B also receives the interconnect cable 142 from the circuit board and rod housing 102A in order to receive power and control signals therefrom relating to power and color selection and/or intensity. The outer shell 201B includes rod opening 212' and the printed circuit board support rails 214'. The printed circuit board 200B is inserted into the outer shell 201B such that the PCB support rails 214' therein provide support and alignment. When the circuit board 200B is fully inserted into the outer shell 201B, the one or more electrical-to-optical converters 204A'–204C' are in alignment with the rod opening 212' so that photons can couple into an end of an acrylic rod 104. The reflector 202' may be the same as reflector 202 having the same functionality to reflect light towards rod opening 212' to more efficiently launch the light from the one or more electrical-to-optical converters 204A'–204C' into an end of the rod 104.

The outer shells 201A and 201B depicted in the embodiment in FIGS. 2A and 2B are cylindrically shaped with a semi-spherical cap. In the embodiments of the linear LED light 100 in FIGS. 1A–1C, the outer shells 201A and 201B are rectangularly shaped.

The acrylic rod 104 in one embodiment is a clear acrylic rod. In another embodiment, the acrylic rod may be colored. In the case of a clear acrylic rod, the electrical-to-optical converters can be controlled to obtain a desired color of lighting. Three optical-to-electric converters can be provided in order to provide proper color mixing of primary colors red, green and blue. To maximize the efficiency of radiation by the acrylic rod, the length of the rod and its diameter or width are proportionate to the wavelength of the light or photons that are to be emitted. The diameter or width of the rod determines how far a light wave will travel down the length of the rod before it escapes or radiates out of the rod. The dimension between wavelength and diameter may be important to uniformly light a rod from one end to another down its length by either a dual point source at opposite ends or a single point source at one end. If uniformity is not a concern, then the ratio between wavelength and diameter or width is of lesser significance. The diameter or width of the rod also varies the focus of the light that is radiated. In one embodiment, a clear acrylic rod 104 is approximately 15.275 inches in length and in the case of a circular cylinder, approximately one-half inch in diameter.

The acrylic rod 104 in some embodiments is cylindrically shaped while in other embodiments it is not. A cylindrically shaped acrylic rod 104 can be a circular cylinder, a rectangular cylinder or other well know cylindrical shape. The shape of the acrylic rod 104 can change the efficiency and somewhat the directionality of the radiation of light. A reflector can also be coupled or formed into the acrylic rod 104 so that the radiation of light therefrom is made more directional and has greater intensity or brightness.

Figure 3A:
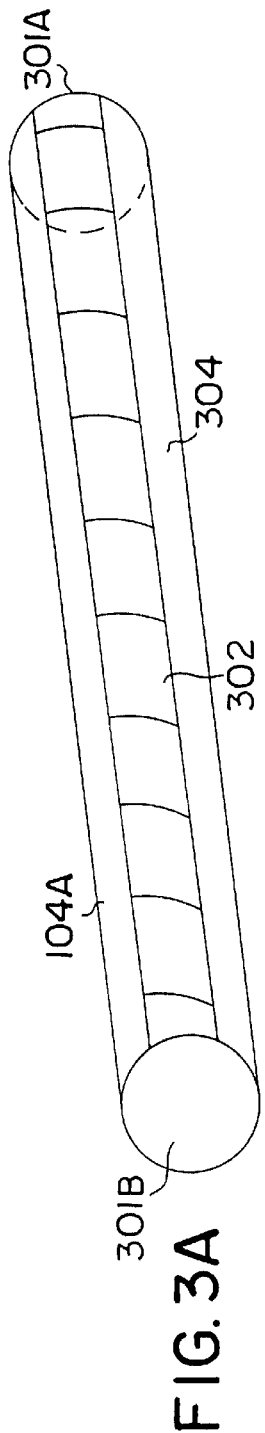
FIGS. 3A–3S illustrate exemplary shapes of the acrylic rod of the present invention.

Referring now to FIGS. 3A–3E, exemplary cylindrical shapes for the acrylic rod 104 are illustrated. Each of the acrylic rods 104 include a first end 301A and a second end 301B. FIG. 3A illustrates a circular cylindrical acrylic rod 104A. The circular cylindrical acrylic rod 104A can include a reflective strip 302 extending along its length. The reflective strip 302 can be glued to the acrylic rod 104 using an adhesive, painted or printed on using a reflective paint or ink, or modeled into the acrylic rod during its formation. The width of the reflective strip 302 can be varied to form differing light directionality in the rod.

Figure 3B:
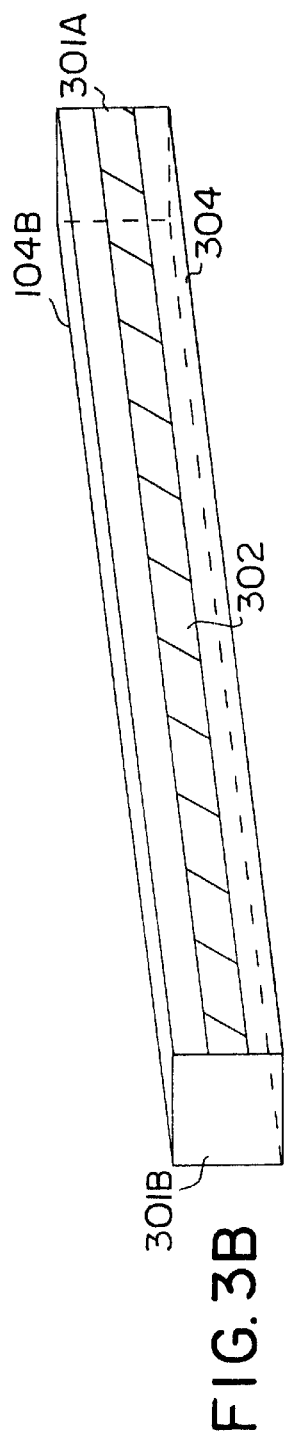
FIGS. 3T and 3U illustrate rotating the acrylic rod with the reflective strip to change the light direction.
Figure 3C:
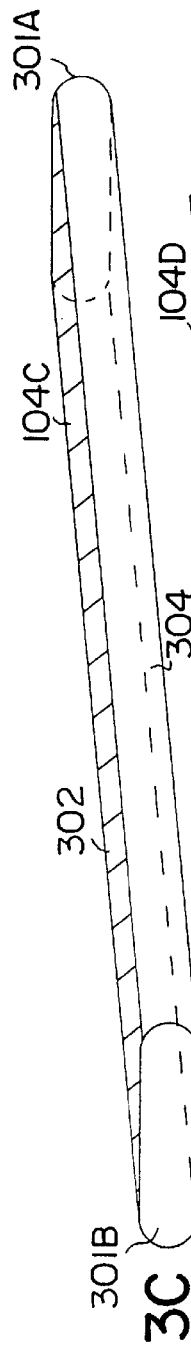
Figure 3D:
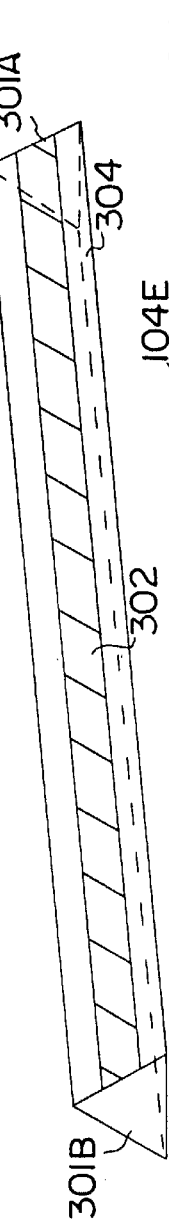
Figure 3E:
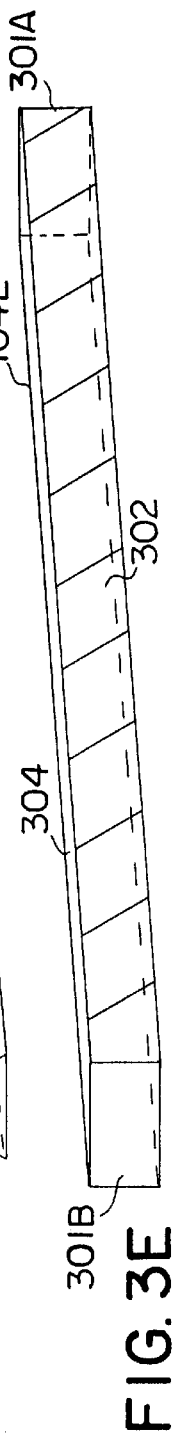

FIG. 3B illustrates a square cylindrical acrylic rod 104B. The square cylindrical acrylic rod 104B can include a reflective strip 302 coupled to or as part of one of its surfaces as shown. FIG. 3C illustrates an elliptical cylindrical acrylic rod 104C. The elliptical cylindrical acrylic rod 104C can include a reflective strip 302 coupled to or as part of one of its surfaces as shown. FIG. 3D illustrates a triangular cylindrical acrylic rod 104D. The triangular cylindrical acrylic rod 104D can include a reflective strip 302 coupled to or as part of one of its surfaces as shown. FIG. 3E illustrates a rectangular cylindrical acrylic rod 104E. The rectangular cylindrical acrylic rod 104E can include a reflective strip 302 coupled to or as part of one of its surfaces as shown. Other cylindrical shapes for the acrylic rod 104 are possible and will exhibit somewhat different radiating patterns for photons of different wavelengths. The diameter or cross-sectional dimension of the acrylic rod 104 can also effect radiation efficiency and the directionality of the light radiating from the rod. The dimensions of the reflective strip 302 coupled to or molded into the acrylic rod can effect the radiation efficiency and the directionality of the light radiating from the rod.

Referring now to FIGS. 3F–3I, various dimensions of a reflective strip are illustrated coupled to a circular cylindrical acrylic rod 104A. In FIG. 3F, a reflective strip 302A couples around one hundred eight degrees of circumference of the circular cylindrical acrylic rod 104A down its length as illustrated. The reflective strip 302A reflects one hundred eighty degrees of the light in the rod. Through the portion of the rod not covered by the reflective strip 302A, light radiates out. In FIG. 3F, the strip portion 304A of the rod 104A which is not covered by the reflective strip, light can radiate out therefrom. In the circular cylindrical rod 104A with strip portion 304A, the angle $\theta_1$ over which light can radiate is one hundred eighty degrees.

In FIG. 3G, a reflective strip 302B couples around two hundred seventy degrees of circumference of the circular cylindrical acrylic rod 104A down its length as illustrated. The reflective strip 302B reflects two hundred seventy degrees of the light in the rod. Through the portion of the rod not covered by the reflective strip 302B, light radiates out. In FIG. 3G, the strip portion 304B of the rod 104A which is not covered by the reflective strip, light can radiate out therefrom. In the circular cylindrical rod 104A with strip portion 304B, the angle $\theta_2$ over which light can radiate is ninety degrees.

In FIG. 3H, a reflective strip 302C couples around three hundred fifteen degrees of circumference of the circular cylindrical acrylic rod 104A down its length as illustrated. The reflective strip 302C reflects three hundred fifteen degrees of the light in the rod. Through the portion of the rod not covered by the reflective strip 302C, light radiates out. In FIG. 3H, the strip portion 304C of the rod 104A which is not covered by the reflective strip, light can radiate out therefrom. In the circular cylindrical rod 104A with strip portion 304C, the angle $\theta_3$ over which light can radiate is forty-five degrees.

In FIG. 3I, a reflective strip 302D couples around ninety degrees of circumference of the circular cylindrical acrylic rod 104A down its length as illustrated. The reflective strip 302D reflects light in the rod through ninety degrees of the circular surface area. Through the surface area portion of the rod not covered by the reflective strip 302D, light radiates out. In FIG. 3I, the strip portion 304D of the surface of the rod 104A which is not covered by the reflective strip, light can radiate out therefrom. In the circular cylindrical rod 104A with strip portion 304D, the angle $\theta_4$ over which light can radiate is two hundred seventy degrees.

While FIGS. 3F–3I illustrate certain size reflective strips 304 providing certain angles of reflection and certain circular surface area for outward radiation, it is to be understood that other shapes and sizes of reflective strips can be utilized to get different angles circumference for reflection, including approximately twenty degrees of reflection with three-hundred forty degrees of the circumference over which light can radiate. Other embodiments of the reflective strip 304 coupled to an acrylic rod 104 can be used to generate different light intensities and different radiating patterns.

Figure 3J:
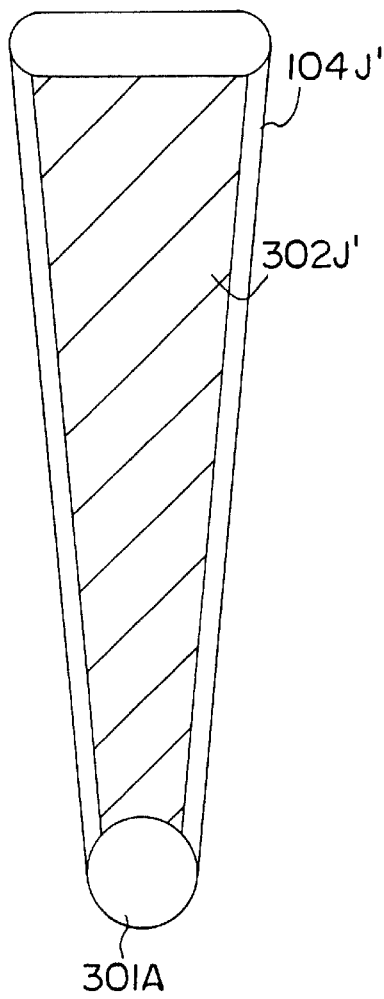
Figure 3K:
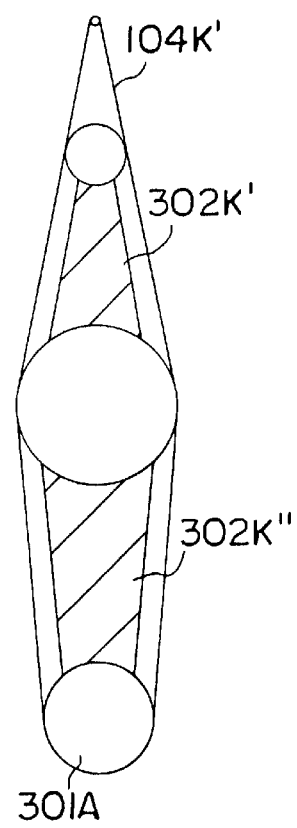
Figure 3L:
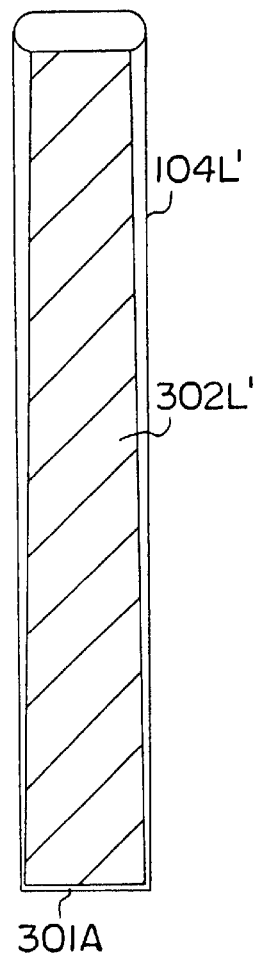

Referring now to FIGS. 3J–3L, acrylic rods 104J', 104K' and 104L' having non-cylindrical shapes are illustrated. With a short length for an acrylic rod 104, a single point light source provided by the circuit board and housing 102A can be used to couple photons into a single end 301A. In this case, the circuit board and rod housing 102B is not used and the interconnect cable 114 is not needed. The acrylic rods 104J', 104K' and 104L' in FIGS. 3J–3L respectively, also have a shorter length for use with a single point light source.

In FIG. 3J, the acrylic rod 104J' begins with a circle at one end 310A and expands outward to an oval at an opposite end. The acrylic rod 104J' can also include a reflective strip portion 302J' to reflect light over one surface area and radiate it out from a different surface area. In FIG. 3K, acrylic rod 104K' begins with a small circle at one end, expands outward towards a larger circle in the middle, and then contracts to a smaller circle at an opposite end. The acrylic rod 104K' mimics the shape of a candle flame. The acrylic rod 104K' can also include one or more reflective strip portions 302K' and 302K" to reflect light over one surface area and radiate it out from a different surface area. In FIG. 3L, the acrylic rod 104L' is substantially planer being very thin at one end 310A and expanding to a much thicker rod at an opposite end. The acrylic rod 104L' can also include a reflective strip portion 302L' to reflect light over one surface area and radiate it out from a different surface area.

In all cases, the acrylic rod 104 has an index of refraction that allows photons or light to propagate therein and radiate outward into free space or air. Uniformity or homogenization of the light in the rod is desirable so that light radiates equally down the length of the rod and is directed by the means of the reflective strip. As previously mentioned, the length and diameter of the acrylic rod 104 in proportion to the frequency or wavelength of the light or photons can be important for the homogenization of light. The shape of the acrylic rod 104 can also vary how the photons disperse and radiate outward in a uniform or non-uniform fashion.

In one embodiment, the first end 301A and second end 301B of the acrylic rod 104 are perpendicular planes to the center axis of the cylinder and parallel to each other in order to launch photons into the acrylic rod 104. In other embodiments, the planes of the first end 301A and second end 301B are not perpendicular to the center axis of the acrylic rod 104 but of differing angles to launch photons into the acrylic rod 104 differently or so that they reflect back into the rod differently.

Referring now to FIGS. 3M–3S, various embodiments for the shape of the first end 301A and the second end 301B of acrylic rods are illustrated.

Figure 3M:
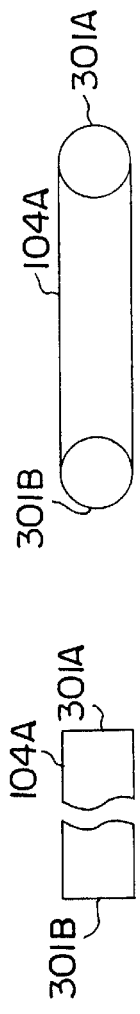

In FIG. 3M, the first end 301A and second end 301B of the acrylic rod 104A are perpendicular planes to the center axis of the acrylic rod 104A and parallel to each other.

Figure 3N:
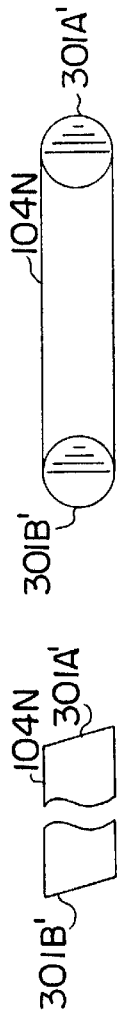

In FIG. 3N, the first end 301A' and second end 301B' of the acrylic rod 104N are formed on an angle with the center axis of the acrylic rod 104N. The first end 301A' and second end 301B' are illustrated as being parallel to each other but need not be.

Figure 3O:
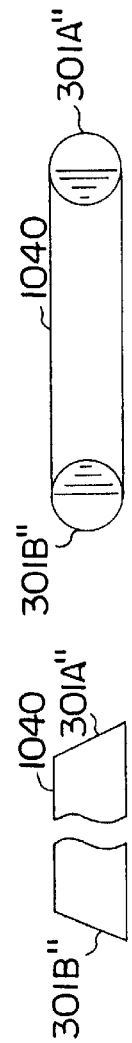

In FIG. 3O, the first end 301A" and second end 301B" of the acrylic rod 104N are also formed on an angle with the center axis of the acrylic rod 104O. However, the first end 301A' and second end 301B' are not parallel to each other and are formed using different angles with the center axis of the acrylic rod 104O.

FIGS. 3M–3N illustrate planar first and second ends for the acrylic rod. However, the shape of the first end and second end of the acrylic rod can be blended into an anamorphic or free-form shape to achieve optimal injection or launching of light into the acrylic rod for given electrical-to-optical converters.

Referring now to FIGS. 3P–3S, exemplary first and second ends of acrylic rods are illustrated having a shape other than planar. The first end and/or second end can be an outward protrusion from the rod or an inward recess into the rod.

Figure 3P:
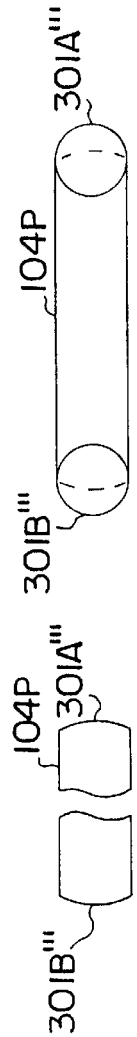

In FIG. 3P, first end 301A''' and second end 301B''' of the acrylic rod 104P are formed into a convex shape. The convex shape can act like a lens to focus light at each end towards the center axis of the acrylic rod 104P.

Figure 3Q:
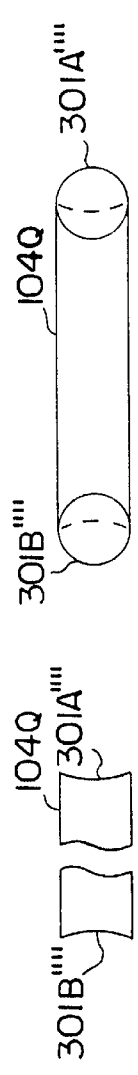

In FIG. 3Q, first end 301A'''' and second end 301B'''' of the acrylic rod 104Q are formed into a concave shape. The concave shape can act like a lens to focus light at each end away from the center axis of the acrylic rod 104Q.

Figure 3R:
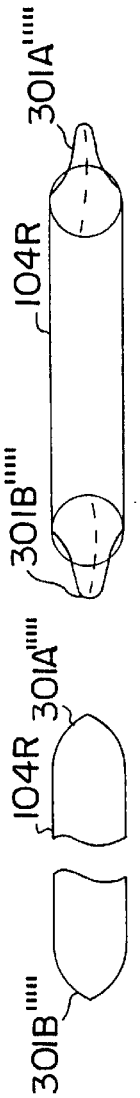

In FIG. 3R, first end 301A''''' and second end 301B''''' of the acrylic rod 104R are formed into a outward conical or outward nipple shape. The outward conical or nipple shape can avoid initial dispersion of light at the end and focus the light like a lens into the center axis of the acrylic rod 104R. The outward conical or nipple shape may provide a more efficient injection of light from the one or more electrical-to-optical converters 204A–204C and 204A'–240C'.

Figure 3S:
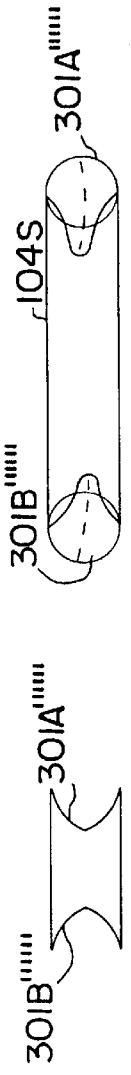

In FIG. 3S, first end 301A'''''' and second end 301B'''''' of the acrylic rod 104S are formed into a inward conical or inward nipple shape. The inward conical or nipple shape can avoid initial dispersion of light at the end and focus the light like a lens into the center axis of the acrylic rod 104S. The inward shape may also allow the ends of the rod 104S to encompass the one or more electrical-to-optical converters 204A–204C and 204A'–240C'.

Figure 3T:
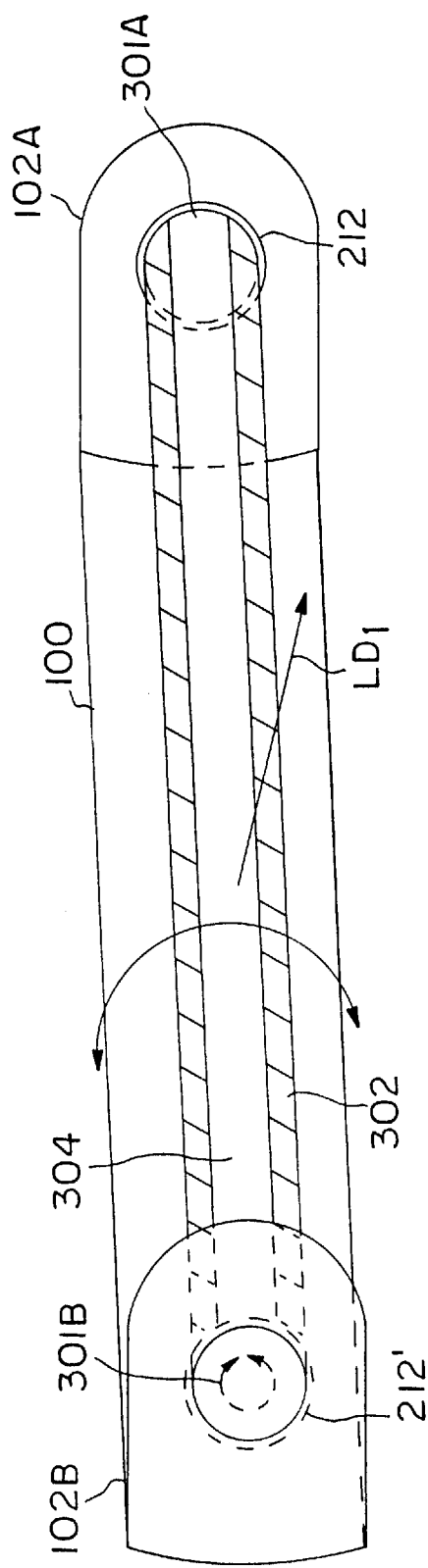
Figure 3U:
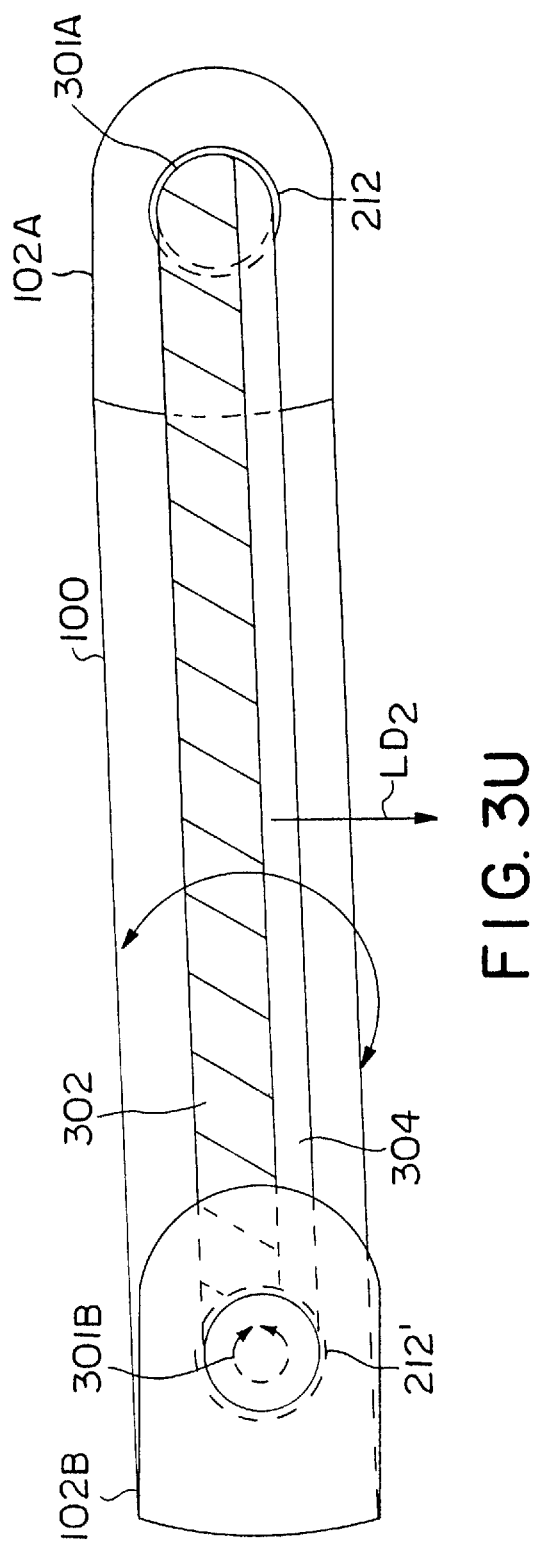

Referring now to FIGS. 3T and 3U, illustrations of how the acrylic rod 104 of the linear LED light 100 may be spun or rotated to change the directionality of light are provided. In FIG. 3T, the acrylic rod 104 is positioned so that the light injected into it is reflected by the reflective strip 302 out the strip portion 304 of the rod 104 in general direction indicated by arrow $LD_1$. The acrylic rod 104 can be rotated around simply by turning it to change the general direction of the light. FIG. 3U illustrates the acrylic rod 104 being rotated so that the reflective strip 302 reflects light into a different direction and the strip portion 304 of the acrylic rod allows light to radiate out in the general direction indicated by arrow $LD_2$. Portions of the acrylic rod 104 near the first end 301A and the second end 301B are inserted into the openings 212 and 212' of the housings 102A and 102B respectively. The housings 102A and 102B allow the acrylic rod 104 to rotate around its axis in the openings 212 and 212' in order to allow the directionality of the light to change. In another embodiment, the acrylic rod 104 may be in a fixed position within the housings 102A and 102B so that the directionality can not change.

Figure 4:
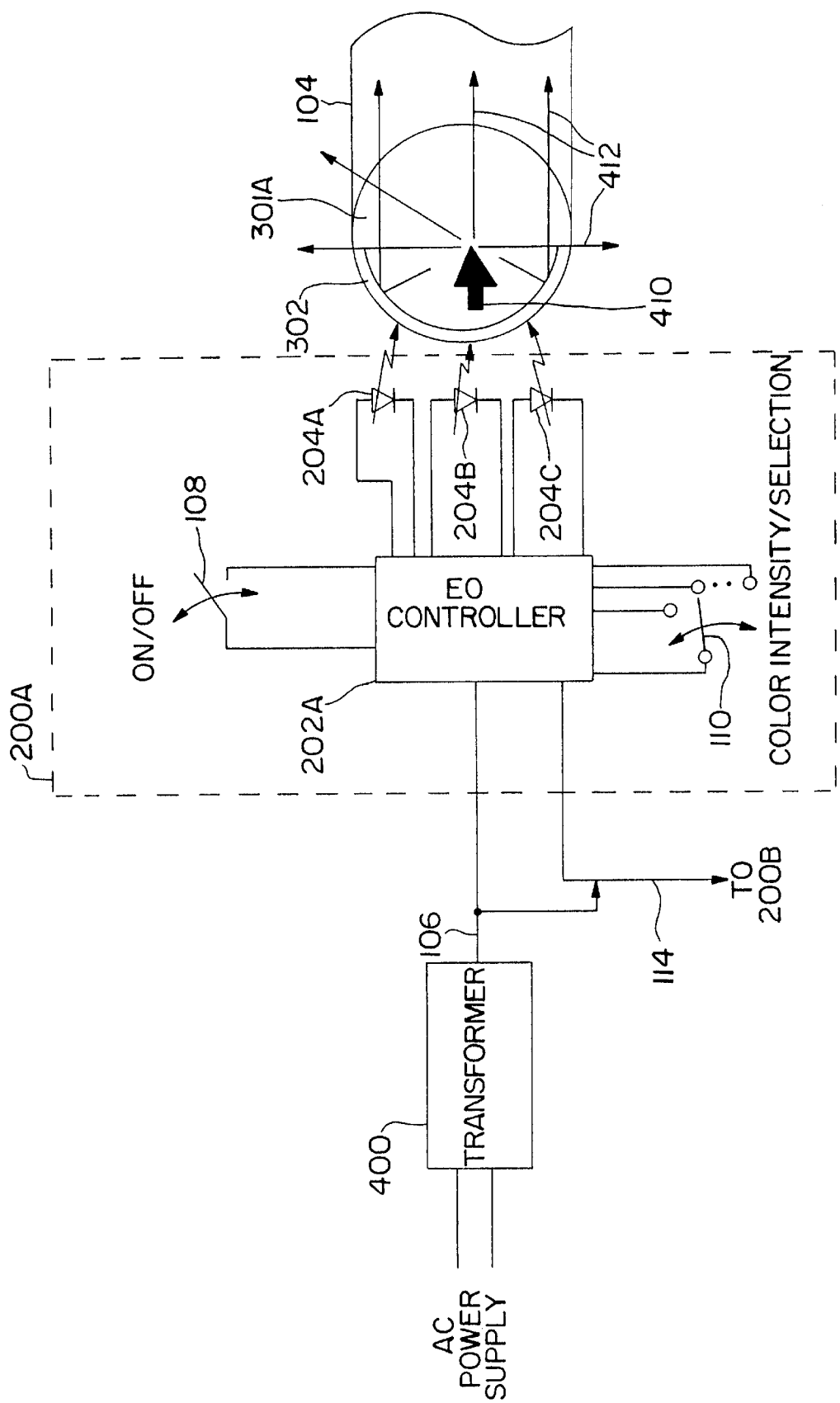
FIG. 4 is a functional block diagram of the present invention.

Referring now to FIG. 4, a functional diagram of an embodiment of the present invention is illustrated. The linear LED light 100 further includes a transformer 400 for converting the AC power supply into desired power supply voltages on the power cable 106 for the electrical-to-optical controllers 203A and 203B. The power provided by the transformer 400 is a low voltage power supply for the solid state circuitry of the EO controllers 203A and 203B. The EO controller 203A is coupled to the on/off switch 108 to turn on and off the generation of photons by the one or more electrical-to-optical (EO) converters 204A–204C. The electrical-to-optical (EO) controller 203A is also coupled to the optional power intensity/selection switch 110 to receive a signal selecting the intensity of the light or the selection of a color. In the case of a color selection switch, the EO controller receives a selection signal for the frequency of light that is to be generated. The EO controller varies the frequency of photons generated by each of the electrical-to-optical converters 204A–204C so that their combination generates the desired color. In another case, the EO controller receives an intensity signal for the brightness of the light that is to be generated by the electrical-to-optical converters 204A–204C. The EO controller then varies the number of electrical-to-optical converters (EOs) that are turned on in order to change the light intensity.

The one or more electrical-to-optical converts 204A–204C emit photons into the first end 301A of the acrylic rod 104 as illustrated by the incident light ray 410. In the acrylic rod 104, the incident light ray 410 is dispersed. Light rays dispersed outwards towards the reflective strip 302 of the rod 104 are reflected back in. The light rays dispersed away from the reflective strip 302 and the light rays reflected by the reflective strip radiate outward from the acrylic rod 104 as illustrated by the outward radiating rays 412. In order to efficiently couple photons into the acrylic rod 104, the one or more electrical-to-optical converters (EOs) 204A–204C are aligned with the end of the acrylic rod 104. Preferably they are aligned nearer the central optical axis of acrylic rod. The rod openings 212 and 212' in the respective housings 102A and 102B align the acrylic rod 104 to the one or more electrical-to-optical converters (EOs) 204A–204C. Control signals from the EO controller 203A combine with power signals from the power cable 106 to form the interconnect cable 114 which is routed to the printed circuit board 200B and the respective EO controller 203B. The circuit board 200B is similar to circuit board 200A but may not include the on/off control switch 108 and the optional selection switch 110 if central control of each side is desired.

Figure 5:
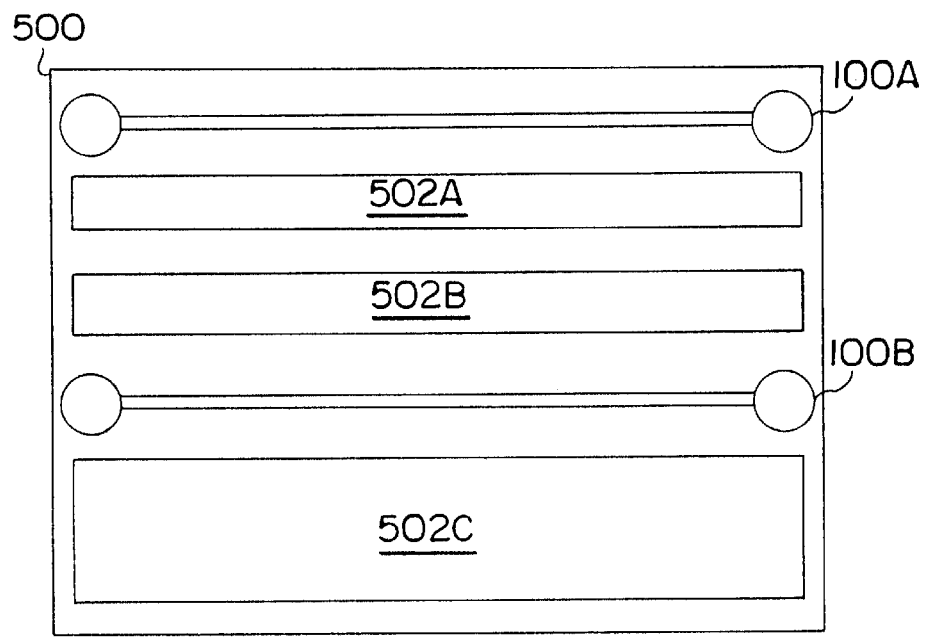
FIG. 5 is a front view of an equipment rack in which the present invention may be utilized to provide lighting.

Referring now to FIGS. 5–9, exemplary applications of the linear LED light 100 are illustrated. In FIG. 5, linear LED lights 100A and 100B are installed in an equipment rack 500. Each of the linear LED lights 100A and 100B fit into a single rack space. The linear LED lights 100A and 100B provided lighting for the rack mounted equipment 502A, 502B and 502C. The light generated by the linear LED lights 100A and 100B illuminate buttons, knobs and other controls of the rack mounted equipment. The rack mounted equipment 502A, 502B, and 502C may be audio equipment utilized in musical productions such as concerts or theatrical productions. In this case the linear LED lights 100 may provide a low intensity light or a color of light appropriate for the venue. In another case, the rack mounted equipment 502A–502C maybe networking equipment in which case the linear LED lights 100 provide a low power and a low heat lighting source to illuminate network control buttons or knobs.

Figure 6:
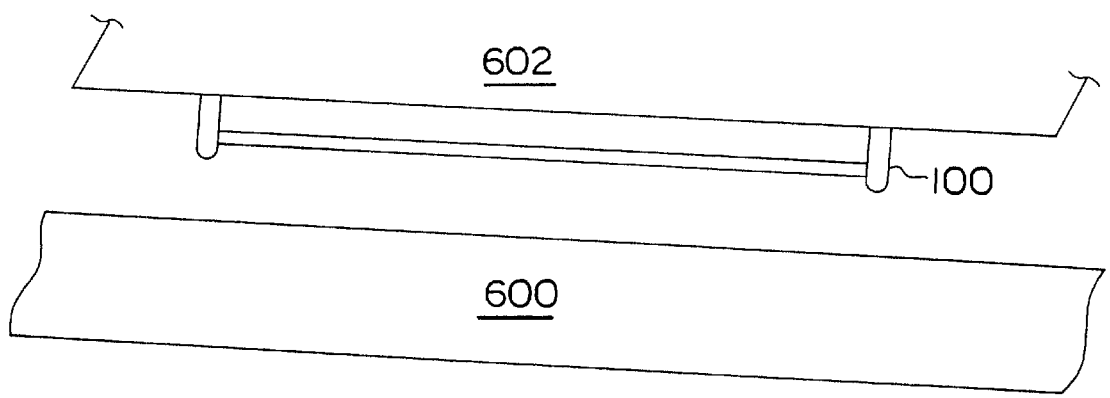
FIG. 6 is a perspective view of a counter and cabinet in which the present invention may be utilized to provide under-counter lighting.

In FIG. 6, the linear LED light 100 provides under-counter lighting. In this case, the linear LED light 100 is mounted to cabinetry 602 or other support surface in order to provide lighting for the counter 600.

Referring now to FIGS. 7A and 7B, the linear LED light 100 may also be utilized in lighting fixtures 700. In this case, one or more linear LED lights 100A–100N are mounted to a fixture housing 701. The power cable 106 can be shared by the multiple LED lights 100 utilizing a single transformer 400. FIG. 7B illustrates a side view of the light fixture 700. A lens or diffuser 702 can be coupled to the fixture housing 701 in order to diffuse or focus the light from the linear LED lights 100A–100N. The light fixture 700 can further include a support chain/bracket 704 or fixture mount openings 706 to mount or support the light fixture 700 from a surface. If white lighting is desired to be provided by the linear LED lights 100A–100N, it can be generated in one embodiment by combining red, green and blue together from at least three electrical-to-optical converters 204A–204C.

The linear LED lights 100 illustrated in FIGS. 5–7B are dual point source lights. That is, photons can be generated and coupled into both ends of the acrylic rod 104. Dual point source lights can add brightness to a longer rod. The linear LED lights can also be configured as single point source lights as previously discussed with reference to the acrylic rods illustrated in FIGS. 3F–3H. Single point source lights can effectively light a shorter rod at one end.

Figure 8:
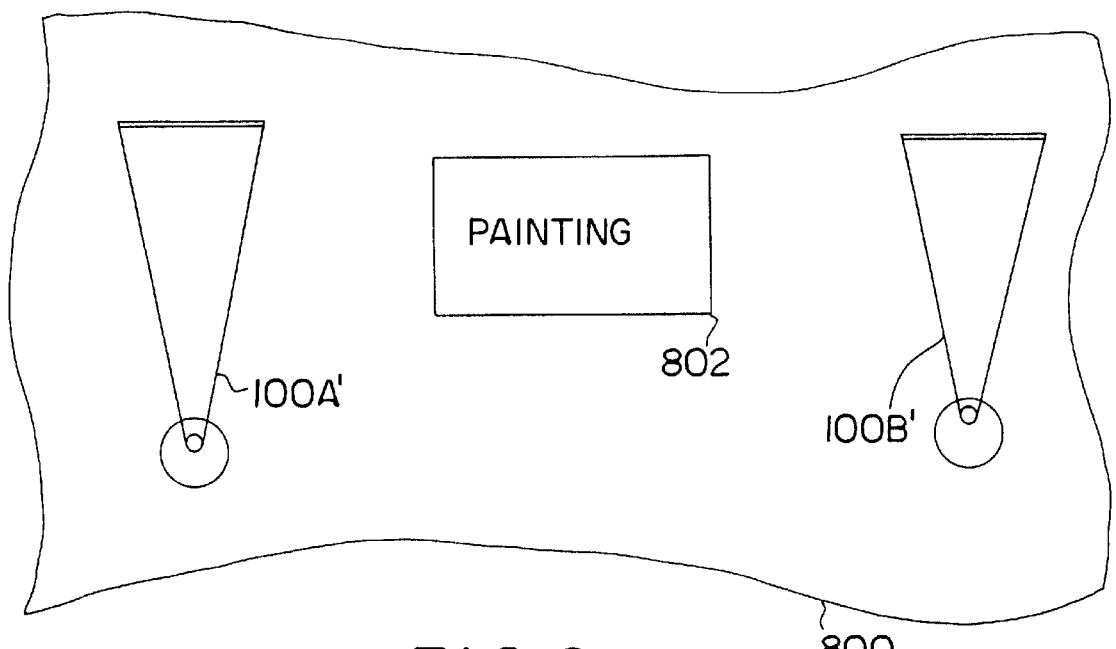
FIG. 8 is a front view of a wall in which the present invention may be utilized to provide wall lighting.

Referring now to FIG. 8, a single point source application of a linear LED light is illustrated. In FIG. 8 the wall 800 includes a hanged painting 802 and a pair of single point source linear LED lights 100A' and 100B' affixed thereto. In this case, the linear LED lights 100A' and 100B' act similar to sconces affixed to a wall. The linear LED lights 100A' and 100B' need only one circuit board and rod housing 102A to couple photons into an acrylic rod. In an embodiment, the linear LED light can project a single wavelength of light without harmful ultraviolet wavelengths that otherwise might damage a painting.

Figure 9:
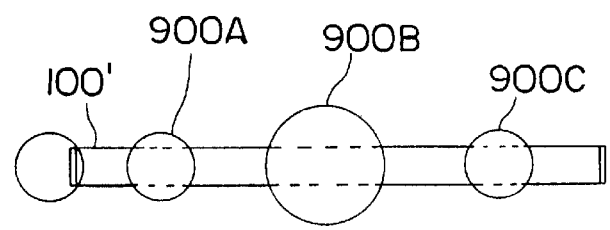
FIG. 9 is a front view of an application in which the present invention may be utilized to provide back lighting.
Figure 10:
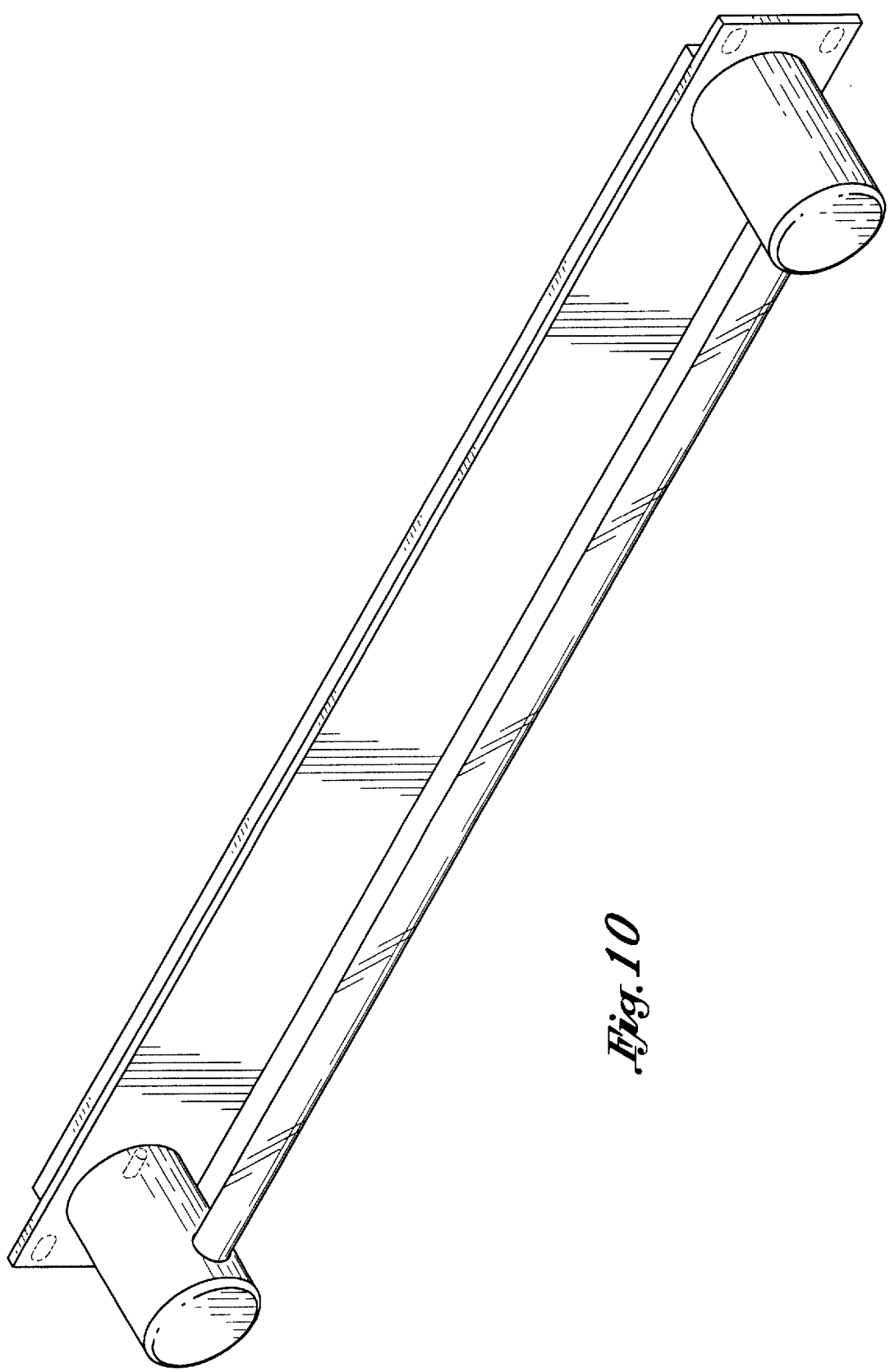
FIG. 10 is a perspective view of a first embodiment of our new design for a light.
Figure 15:
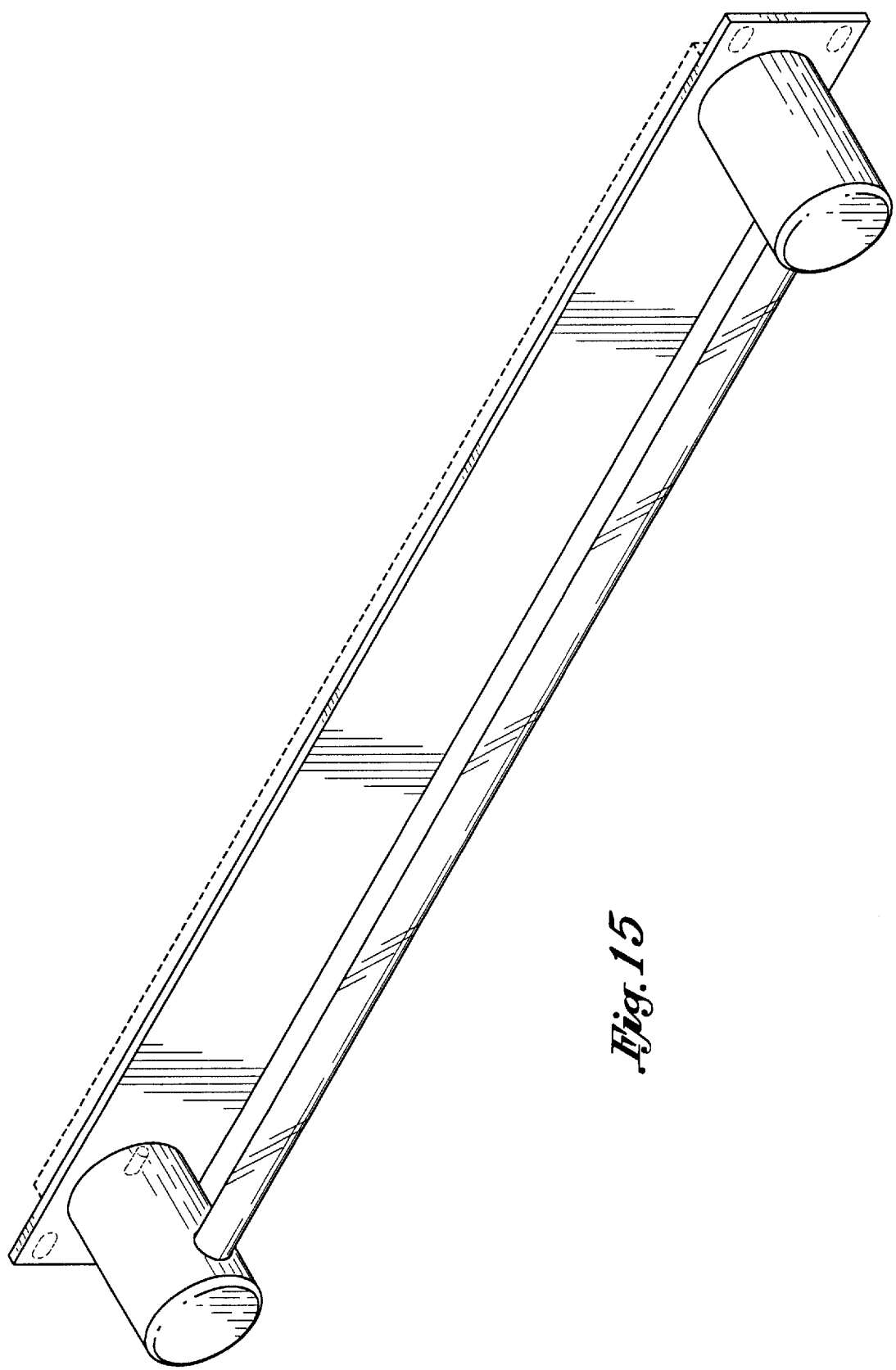
FIG. 15 is a perspective view of a second embodiment of our new design for a light.
Figure 20:
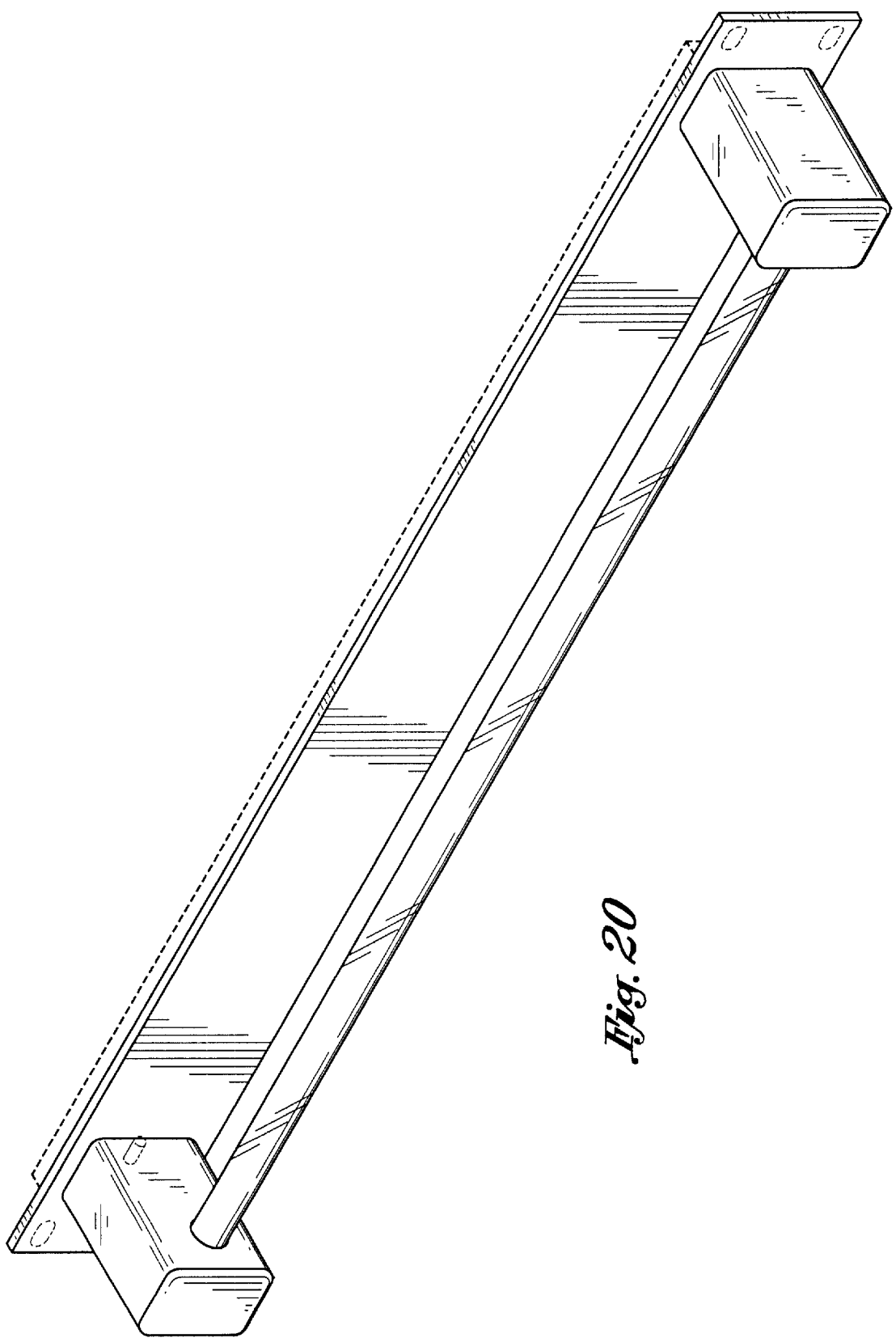
FIG. 20 is a perspective view of a third embodiment of our new design for a light.
Figure 21:
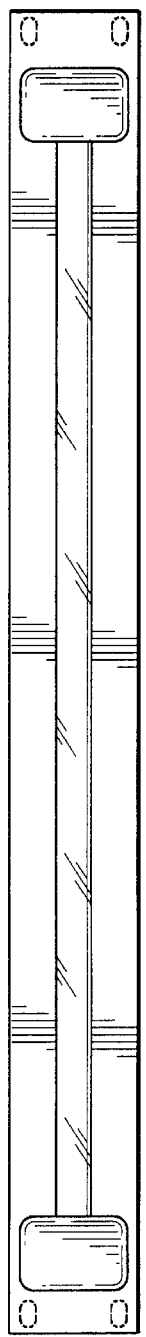
FIG. 21 is a top plan view thereof.
Figure 23:
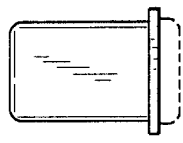
FIG. 23 is a right side elevational view thereof, the left side being a mirror image.
Figure 22:
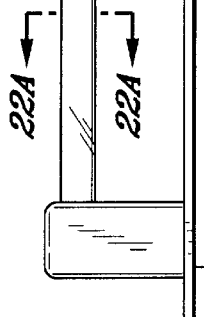
FIG. 22 is a front side elevational view thereof, the back side being a mirror image.
Figure 22A:
FIG. 22A is a cutaway cross section view thereof.
Figure 24:
FIG. 24 is a bottom plan view thereof.
Figure 27:
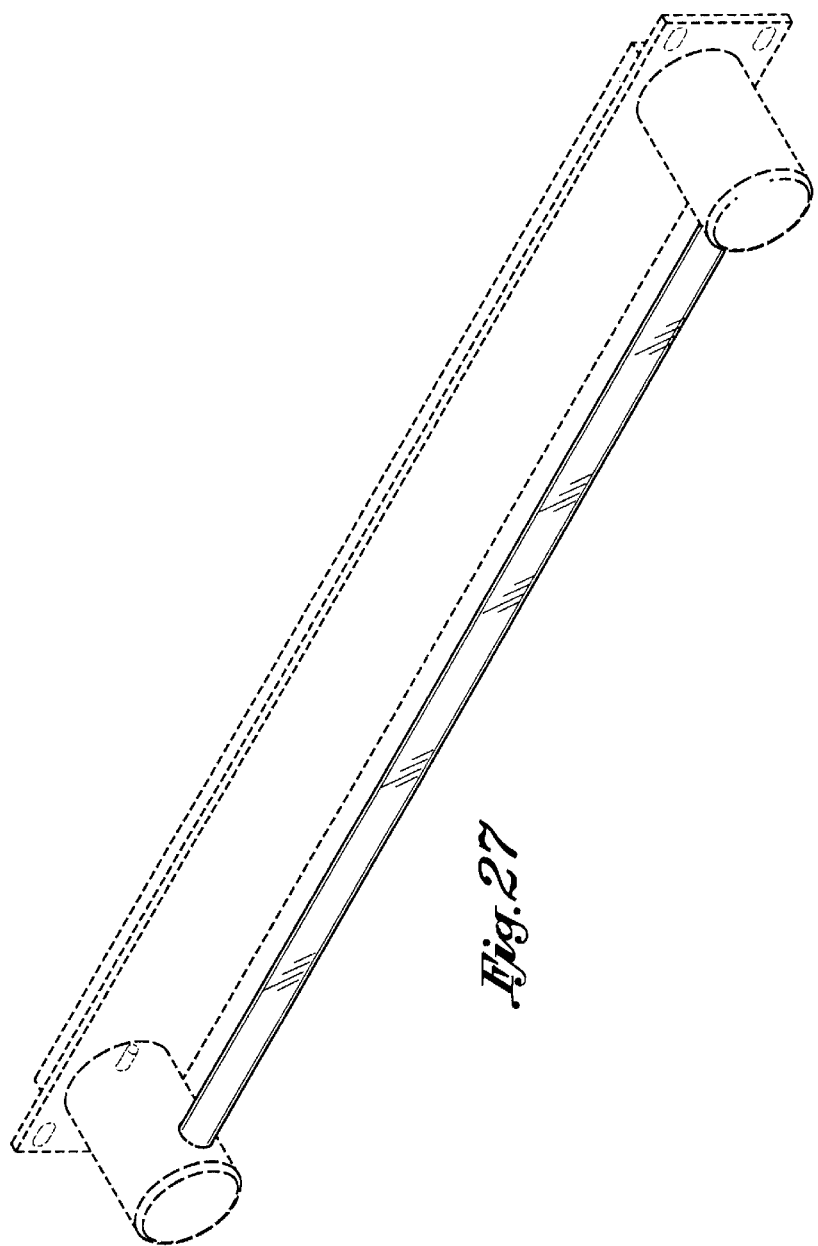
FIG. 27 is a perspective view of a second embodiment of our new design of a transparent rod for a light.
Figure 28:
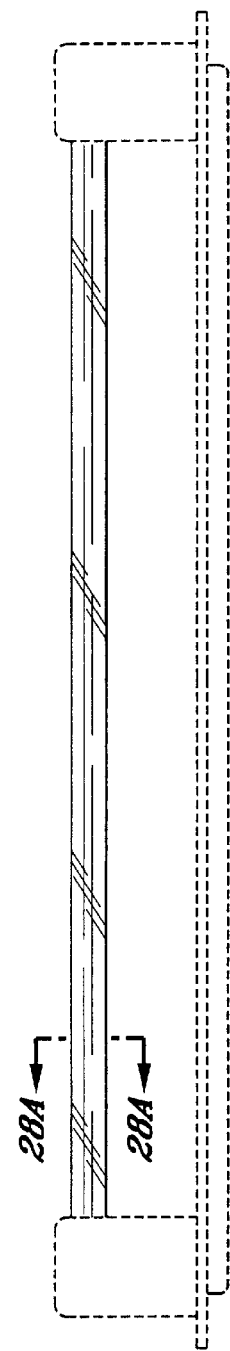
FIG. 28 is a front side elevational view thereof, the back side being a mirror image.
Figure 28A:
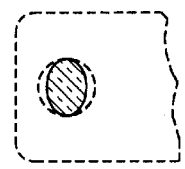
FIG. 28A is a cutaway cross section view thereof.
Figure 29:
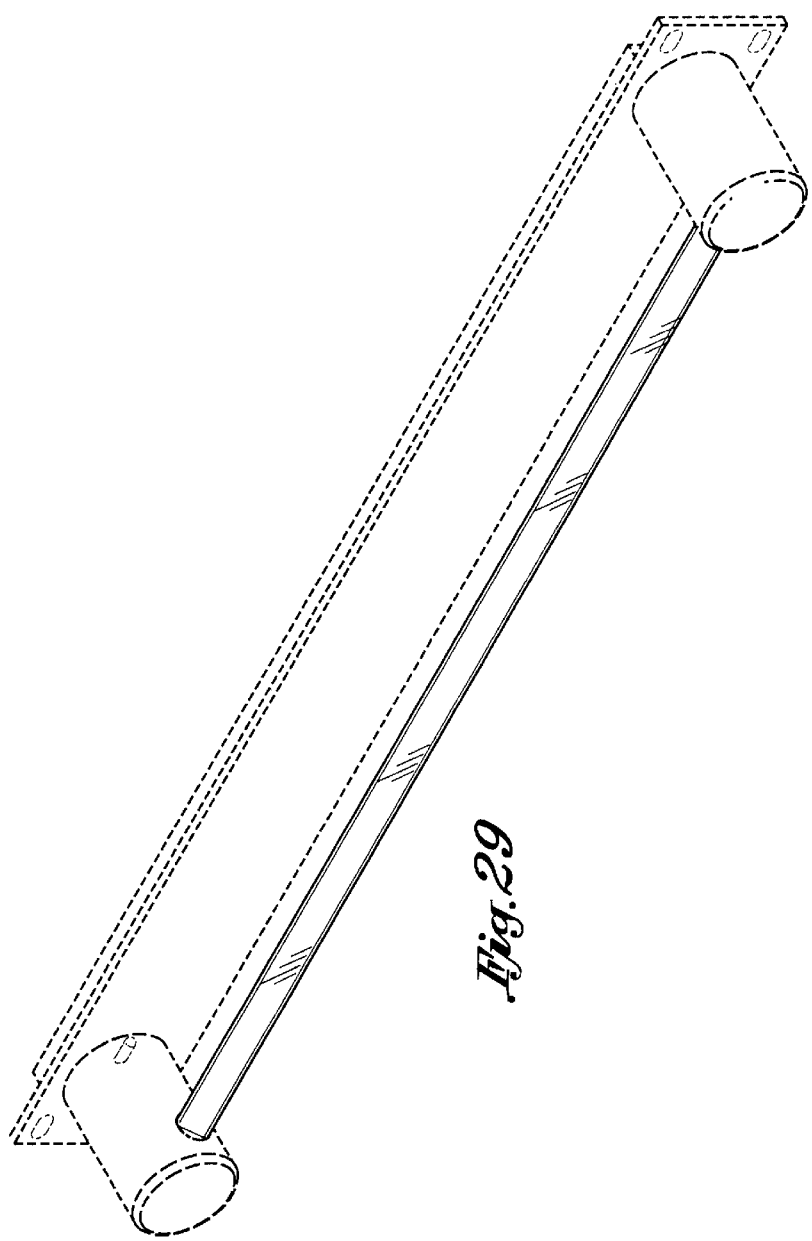
FIG. 29 is a perspective view of a third embodiment of our new design of a transparent rod for a light.
Figure 30:
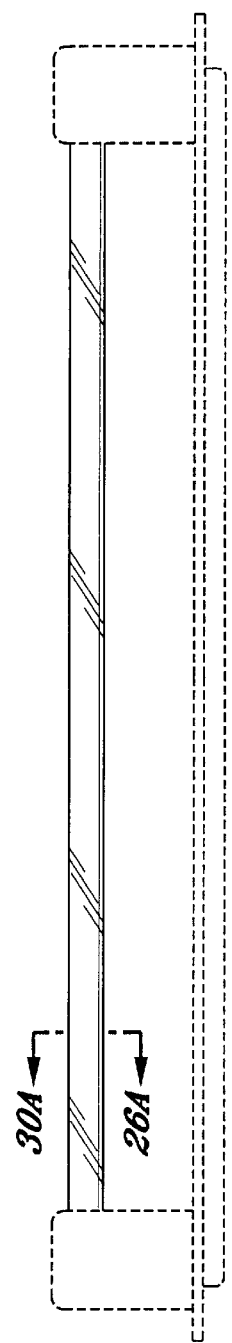
FIG. 30 is a front side elevational view thereof, the back side being a mirror image.
Figure 30A:
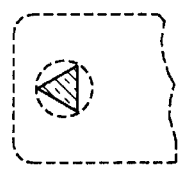
FIG. 30A is a cutaway cross section view thereof.
Figure 39:
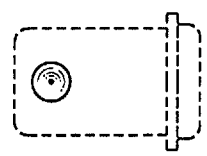
FIG. 39 is a right side elevational view thereof, the left side being a mirror image.
Figure 41:
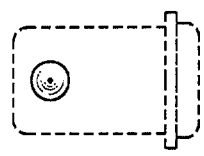
FIG. 41 is a right side elevational view thereof, the left side being a mirror image.
Figure 38:
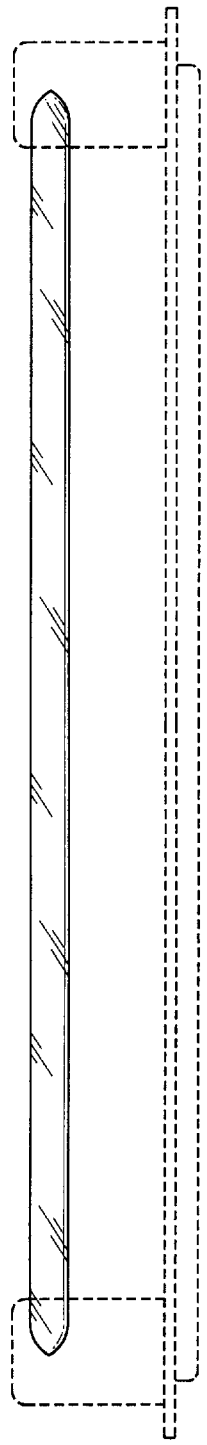
FIG. 38 is a front side elevational view of a seventh embodiment of our new design of a transparent rod for a light, the back side being a mirror image.
Figure 40:
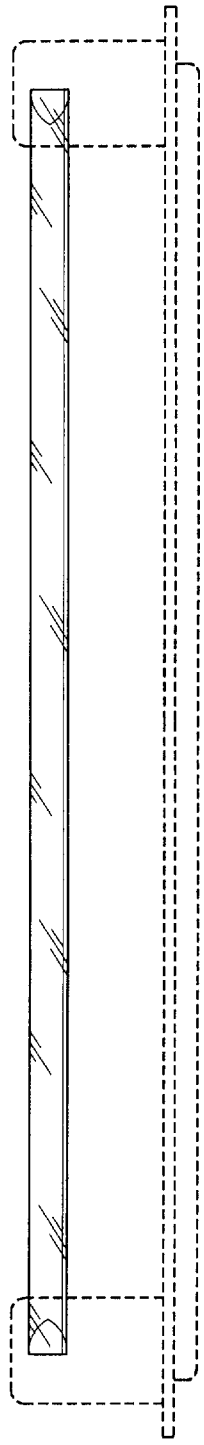
FIG. 40 is a front side elevational view of an eighth embodiment of our new design of a transparent rod for a light, the back side being a mirror image.

Referring now to FIG. 9, another single point source application of the linear LED light is illustrated. In this case, the signal point source linear LED light 100' provides a back lighting for objects 900A, 900B, and 900C. This can provide in-cabinet lighting behind nick knacks within a cabinet or back lighting for gauges that may be in a gauge-cluster, for example.

Linear LED light 100 utilizes solid-state technology and an acrylic rod. As a result of not using glass bulbs, the linear LED light 100 can withstand harsh treatment from transporting the equipment from one place to another. The illumination provided by the linear LED light is functionally similar to that provided by halogen bulbs. The linear LED light does not have a bulb that will burn out nor does it generate any significant level of heat such that the acrylic rod becomes warm. Furthermore, the linear LED light 100 can provide an even distribution of light. The linear LED light can be illuminated in one embodiment to one of any six colors allowing a performer to choose the color to match the aura of a performance or the stage or atmosphere of a club.

The present invention has many advantages over the prior art. One advantage of the present invention is that uniform lighting is provided. Another advantage of the present invention is that power is conserved. Still another advantage of the present invention is that the light remains cool. Still another advantage of the present invention is that the lighting has a longer lifetime.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Rather, the invention should be construed according to the claims that follow below.

What is claimed is:

1. A light comprising;
an acrylic rod having a first end and a second end;
a first circuit board including one or more electrical-to-optical converters to generate photons;
a first end housing having a first opening through which the first end of the acrylic rod is inserted, the first end housing to house the first circuit board and align the one or more electrical-to-optical converters of the first circuit board with the first opening and the first end of the acrylic rod; and
a first reflector coupled to the first circuit board around the one or more electrical-to-optical converters at a first end, a second end of the first reflector aligned with the first opening and receiving the first end of the acrylic rod, the first reflector to reflect photons into the acrylic rod.

2. The light of claim 1, further comprising:
a reflective strip coupled down the length of the acrylic rod to reflect photons out of the acrylic rod.

3. The light of claim 2, wherein the reflective strip encompasses one hundred eight degrees of a diameter of a circular cylindrical acrylic rod.

4. The light of claim 2, wherein
the reflective strip encompasses ninety degrees of a diameter of a circular cylindrical acrylic rod.

5. The light of claim 1, wherein
the one or more electrical-to-optical converters of the first circuit board are light emitting diodes (LEDs).

6. The light of claim 5, further comprising:
an electrical-to-optical controller coupled to the first circuit board to control the one or more LEDs; and
an on/off switch to switch the generation of photons by the one or more LEDs on and off.

7. The light of claim 6, further comprising:
an intensity selection switch to vary the brightness of the generated light.

8. The light of claim 7, further comprising:
a color selection switch to selectively choose the mixture of primary colors generated by the one or more LEDs to vary the color of the generated light.

9. The light of claim 8, further comprising:
a transformer to transform AC power to a safe efficient power to power the one or more LEDs of the first circuit board in an efficient manner.

10. A light comprising:
an acrylic rod having a first end and a second end;
a first circuit board including one or more electrical-to-optical converters to generate photons;
first end housing having a first opening through which the first end of the acrylic rod is inserted, the first end housing to house the first circuit board and align the one or more electrical-to-optical converters of the first circuit board with the first opening and the first end of the acrylic rod;
an electrical-to-optical controller coupled to the first circuit board to control the one or more electrical-to-optical converters;
an on/off switch to switch the generation of photons by the one or more electrical-to-optical converters on and off; and
an intensity selection switch to vary the brightness of the generated light.

11. The light of claim 10, further comprising:
a color selection switch to selectively choose the mixture of primary colors generated by the one or more electrical-to-optical converters to vary the color of the generated light.

12. The light of claim 11, further comprising:
a transformer to transform AC power to a safe efficient power to power the one or more electrical-to-optical converters of the first circuit board in an efficient manner.

13. The light of claim 10, wherein
the one or more electrical-to-optical converters of the first circuit board are light emitting diodes (LEDs).

14. A light comprising:
an acrylic rod having a first end and a second end;
a first circuit board including one or more electrical-to-optical converters to generate photons;
a first end housing having a first opening through which the first end of the acrylic rod is inserted, the first end housing to house the first circuit board and align the one or more electrical-to-optical converters of the first circuit board with the first opening and the first end of the acrylic rod; and
a transformer to transform AC power to a safe efficient power to power the one or more electrical-to-optical converters of the first circuit board in an efficient manner.

15. A method of lighting without a light bulb, the method comprising:
generating first photons of a desired color;
coupling the first photons into a first end of an acrylic rod;
radiating the first photons out of the acrylic rod as light; and uniformly varying the mixture of the first photons generated and coupled into the acrylic rod to vary the intensity of the light.

16. The method of claim 15, further comprising:

varying a mixture of the first photons to change the color of the light.

17. The method of claim 15, further comprising:

generating second photons of the desired color;

coupling the second photons into a second end of the acrylic rod; and radiating the second photons out of the acrylic rod as light.

18. The method of claim 17, further comprising:

varying a mixture of the first photons and the second photons to change the color of the light.

* * * * *